United States Patent
Nagura

(10) Patent No.: US 9,470,557 B2
(45) Date of Patent: Oct. 18, 2016

(54) ENCODER AND APPARATUS USING ENCODER

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 14/484,467

(22) Filed: Sep. 12, 2014

(65) Prior Publication Data

US 2015/0076332 A1 Mar. 19, 2015

(30) Foreign Application Priority Data

Sep. 13, 2013 (JP) ................................. 2013-191095

(51) Int. Cl.
| | |
|---|---|
| *G01D 5/34* | (2006.01) |
| *G01D 5/347* | (2006.01) |
| *G01B 11/14* | (2006.01) |
| *G01B 11/26* | (2006.01) |
| *G01D 5/24* | (2006.01) |
| *G01D 5/249* | (2006.01) |

(52) U.S. Cl.
CPC .............. *G01D 5/3473* (2013.01); *G01B 11/14* (2013.01); *G01B 11/26* (2013.01); *G01D 5/34784* (2013.01); *G01D 5/34792* (2013.01); *G01D 5/24* (2013.01); *G01D 5/2497* (2013.01)

(58) Field of Classification Search
CPC ...................................................... G01D 5/34
USPC .......... 250/231.1–231.18; 33/706, 707, 1 N, 33/1 PT; 341/13, 14; 356/616, 617
See application file for complete search history.

(56) References Cited

U.S. PATENT DOCUMENTS

| | | | |
|---|---|---|---|
| 5,332,896 | A | 7/1994 | Holzapfel |
| 8,698,071 | B2 | 4/2014 | Nagura |

(Continued)

FOREIGN PATENT DOCUMENTS

| | | |
|---|---|---|
| CN | 102121833 A | 7/2011 |
| CN | 102435215 A | 5/2012 |

(Continued)

OTHER PUBLICATIONS

Extended European Search Report issued in EP14184355.7, mailed May 22, 2015.

(Continued)

*Primary Examiner* — Renee D Chavez
(74) *Attorney, Agent, or Firm* — Rossi, Kimms & McDowell LLP

(57) ABSTRACT

The encoder includes a scale provided with first and second periodic patterns, a sensor movable relatively with respect to the scale and including a detection element array to detect the first and second periodic patterns, a periodic signal producer to produce, by using output from the detection element array, a first periodic signal changing corresponding to a first period of the first periodic pattern and a second periodic signal changing corresponding to a second period of the second periodic pattern, and a correction signal producer to produce, by using the second periodic signal, a correction signal for reducing in the first periodic signal a signal component changing corresponding to the second period. A position calculator produces, by using the first periodic signal and the correction signal, information indicating position.

10 Claims, 12 Drawing Sheets

(56) References Cited

U.S. PATENT DOCUMENTS

| | | |
|---|---|---|
| 2012/0261561 A1 | 10/2012 | Horiguchi et al. |
| 2012/0262731 A1* | 10/2012 | Nagura .............. G01D 5/34746 356/616 |
| 2013/0096862 A1 | 4/2013 | Nakamura |

FOREIGN PATENT DOCUMENTS

| | | |
|---|---|---|
| EP | 2388556 B1 | 3/2013 |
| EP | 2581712 A2 | 4/2013 |
| JP | 2009198318 A | 9/2009 |

OTHER PUBLICATIONS

Office Action issued in Chinese Appln. No. 201410462553.9 mailed Jul. 1, 2016. English translation provided.

* cited by examiner

ENCODER AND APPARATUS USING ENCODER

BACKGROUND OF THE INVENTION

1. Field of the Invention

The present invention relates to an encoder to be used in various apparatuses, such as optical apparatuses, which outputs a signal that indicates position of a movable member provided in such apparatuses, the encoder outputting the signal by relative movement of a scale and a sensor with movement of the movable member.

2. Description of the Related Art

Encoders used to detect position or velocity of a movable member are each constituted by a scale which is provided with a periodic pattern and a sensor which outputs a periodic signal that periodically changes depending on the periodic pattern in response to relative movement of the scale and the sensor. The encoders are classified into incremental encoders each detecting a relative position of the scale and the sensor, and absolute encoders each detecting an absolute position of the scale or the sensor.

Japanese Patent Laid-Open No. 2009-198318 discloses a photoelectric absolute encoder formed such that its scale includes multiple tracks thereon each provided with a periodic pattern whose shape or pitch periodically changes in a position detection direction (or a length measurement direction). This encoder can detect an absolute position of the scale with high accuracy by using a combination of signals which are acquired by detection of the periodic patterns provided in the multiple tracks and whose periods are different from each other.

The encoder disclosed in Japanese Patent Laid-Open No. 2009-198318, however, detects the periodic patterns provided in the multiple tracks by using multiple light-receiving element arrays each provided to the sensor for each of the periodic patterns. With this configuration, accuracy in acquiring the periodic signals may be decreased due to a displacement of mounting positions of a light source and the light-receiving element arrays in a height direction (in which light transmitted through or reflected by the periodic patterns travels toward the sensor) and due to an error of an image magnification caused by a relative inclination between the scale and the sensor. This consequently makes it impossible for the encoder to perform highly accurate position detection.

SUMMARY OF THE INVENTION

The present invention provides an encoder capable of performing highly accurate position detection and provides an apparatus using the encoder.

The present invention provides as an aspect thereof an encoder including a scale provided with a first periodic pattern having a first period and a second periodic pattern having a second period different from the first period, a sensor movable relatively with respect to the scale and including a detection element array configured to detect the first and second periodic patterns, a periodic signal producer configured to produce, by using output from the detection element array detecting the first periodic pattern, a first periodic signal changing corresponding to the first period of the first periodic pattern and to produce, by using output from the detection element array detecting the second periodic pattern, a second periodic signal changing corresponding to the second period of the second periodic pattern, a correction signal producer configured to produce, by using the second periodic signal, a correction signal for reducing in the first periodic signal a signal component changing corresponding to the second period of the second periodic pattern, and a position calculator configured to produce, by using the first periodic signal and the correction signal, information indicating position.

The present invention provides as another aspect thereof an apparatus including the above encoder, and a movable member whose position is to be detected using the encoder.

Other aspects of the present invention will become apparent from the following description and the attached drawings.

DESCRIPTION OF THE EMBODIMENTS

Exemplary embodiments of the present invention will be described below with reference to the attached drawings.

Embodiment 1

Figure 1:
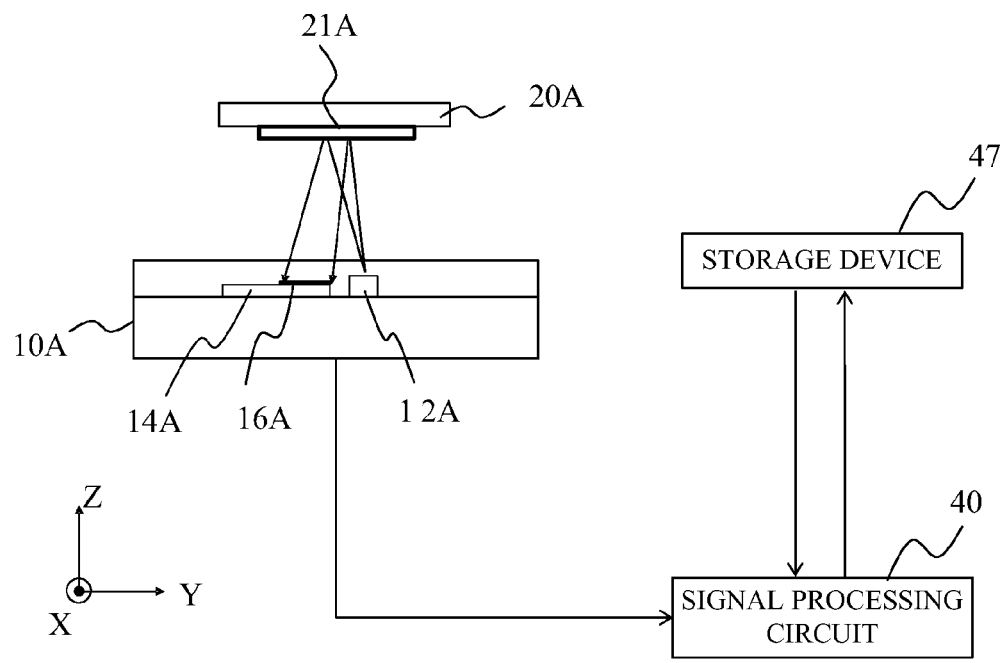
FIG. 1 is a diagram illustrating a configuration of an encoder that is Embodiment 1 of the present invention.

FIG. 1 illustrates a configuration of an optical encoder that is a first embodiment (Embodiment 1) of the present invention. The encoder includes a sensor unit 10A attached to a fixed member (not illustrated), a scale 20A attached to a movable member (not illustrated), a signal processing circuit 40 as a signal processor and a storage device 47. The fixed member and the movable member are part of an apparatus including the encoder. Alternatively, the scale 20A and the sensor unit 10A may be respectively attached to the fixed member and the movable member. That is, it is enough that the optical encoder is configured to allow the sensor unit 10A and the scale 20A to move relatively.

The sensor unit 10A is a light emitting and receiving sensor unit in which a light source 12A constituted by an LED or the like and a light-receiving IC 14A having a light-receiving element array 16A are mounted to a single package. The light-receiving element array 16A includes multiple light-receiving elements (detection elements) constituted by photo diodes or the like. In the light-receiving element array 16A, the multiple light-receiving elements are arranged in an X direction which is a movement direction (i.e., a position detection direction) of the scale 20A (i.e., of the movable member).

On a light-transmissive substrate (e.g., a glass plate or a film) of the scale 20A, a track 21A including multiple periodic patterns each formed by a chrome reflective film are formed. Each periodic pattern alternately has: in the X direction, reflective portions each reflecting light emitted from the light source 12A of the sensor unit 10A toward the light-receiving element array 16A; and non-reflective portions each not reflecting the light. In other words, each periodic pattern spatially modulates, in the X direction, an energy distribution that the light from the light source 12A has. A modulation period in this spatial modulation corresponds to a pitch of each periodic pattern.

Although this embodiment describes a case where a reflective scale is used as the scale 20A, a transmissive scale may be used which is provided with periodic patterns each alternately including transmissive areas and non-transmissive areas.

In addition, this embodiment describes the optical encoder in which the sensor unit 10A detects, by an optical method, tracks (periodic patterns) provided on the scale 20A; the track will be described later. However, a position detection process, which will be described later, may be applied to a magnetic encoder which detects the tracks by a magnetic method or to a capacitive encoder which detects the tracks by a capacitive method. The magnetic encoder is provided with magnetic patterns formed by magnetic substances arranged on the scale in a similar manner to the reflective films in this embodiment. The magnetic encoder uses magnetic field detection elements located close to the scale and arranged in an array to detect a magnetic polarity distribution generated by the magnetic patterns. On the other hand, the capacitive encoder may be configured to use a conductive electrode pattern formed on the scale and another array-like electrode pattern closely facing the conductive electrode pattern to detect a capacity distribution.

On the track 21A, multiple periodic patterns whose pitches (periods) in the X direction are different from each other are periodically (cyclically) arranged in a Y direction orthogonal to the X direction. This embodiment will describe a case where first periodic patterns whose pitch in the X direction is a first pitch and second periodic patterns whose pitch in the X direction is a second pitch are alternately arranged in the Y direction.

The light-receiving IC 14A has a signal separation function of separating output from the light-receiving element array 16A into signals corresponding to respective periodic patterns of the track 21A. The signal separation function can be achieved by providing, as the light-receiving element array 16A, individual light-receiving element arrays corresponding to the respective periodic patterns. The signal separation function can be achieved also by switching, of the light-receiving element array 16A, light-receiving elements used for detection of each periodic pattern, by using a switching circuit provided on the light-receiving IC 14A.

The signal processing circuit 40 processes the output signal (hereinafter referred to as "an encoder signal") from the light-receiving element array 16A to convert the encoder signal into information on position (position information) of the scale 20A. In addition, the signal processing circuit 40 performs an interpolation process on the encoder signal and also writes and reads the position information in and from the storage device 47.

Figure 2:
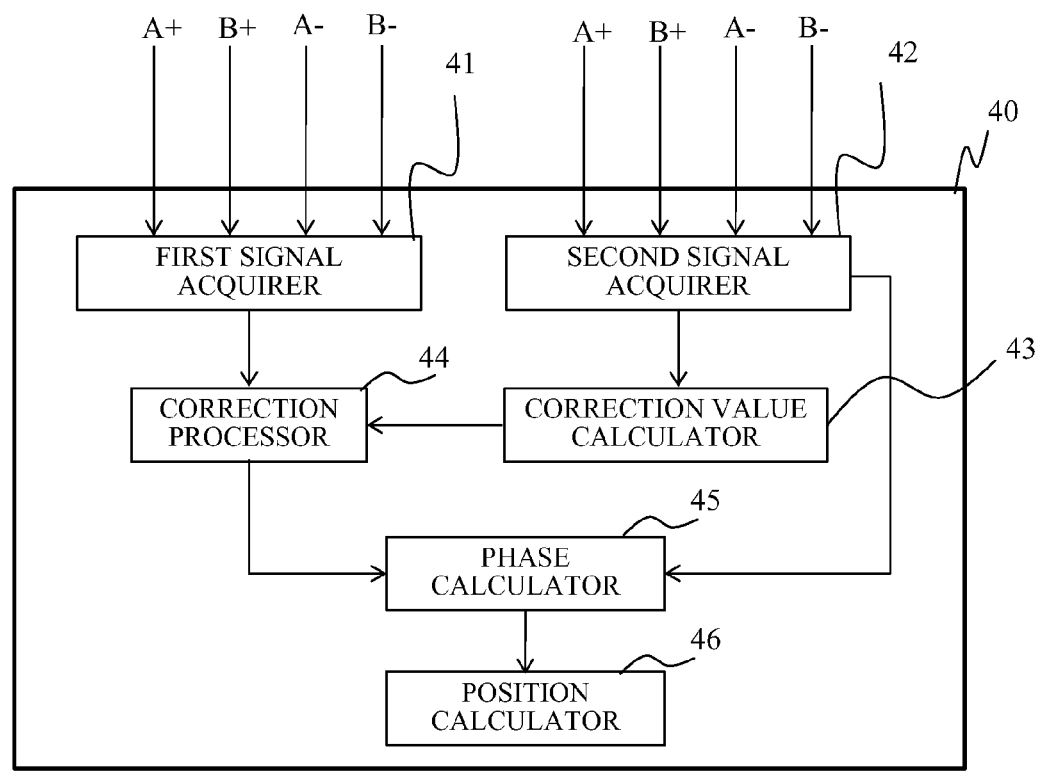
FIG. 2 is a block diagram of a signal processing circuit in Embodiment 1.

FIG. 2 illustrates an internal configuration of the signal processing circuit 40. The signal processing circuit 40 includes a first signal acquirer 41, a second signal acquirer 42, a correction value calculator 43, a correction processor 44, a phase calculator 45 and a position calculator 46. The first signal acquirer 41 and the second signal acquirer 42 constitute a periodic signal producer, and the correction value calculator 43 constitutes a correction signal producer. Moreover, the correction processor 44, the phase calculator 45 and the position calculator 46 constitute a position calculator. The position calculator 46 calculates the position information of the scale 20A and may have a function of calculating relative position information indicating a relative position of the scale 20A and a function of calculating absolute position information indicating an absolute position of the scale 20A.

A divergent light flux emitted from the light source 12A of the sensor unit 10A is projected onto the track 21A on the scale 20A. The light flux reflected by the track 21A (that is, by the periodic patterns) is received by the light-receiving element array 16A of the sensor unit 10A. In this embodiment, the light-receiving element array 16A receives an optical image (hereinafter referred to as "a pattern image" or "a magnified image") whose reflectance distribution is magnified approximately twice that of the track 21A.

The light flux received by the light-receiving element array 16A is converted into an electrical signal and then sent to the signal processing circuit 40 as the encoder signal. As described above, the signal processing circuit 40 converts the encoder signal from the light-receiving element array 16A into the position information of the scale 20A to output the position information.

Figure 3:
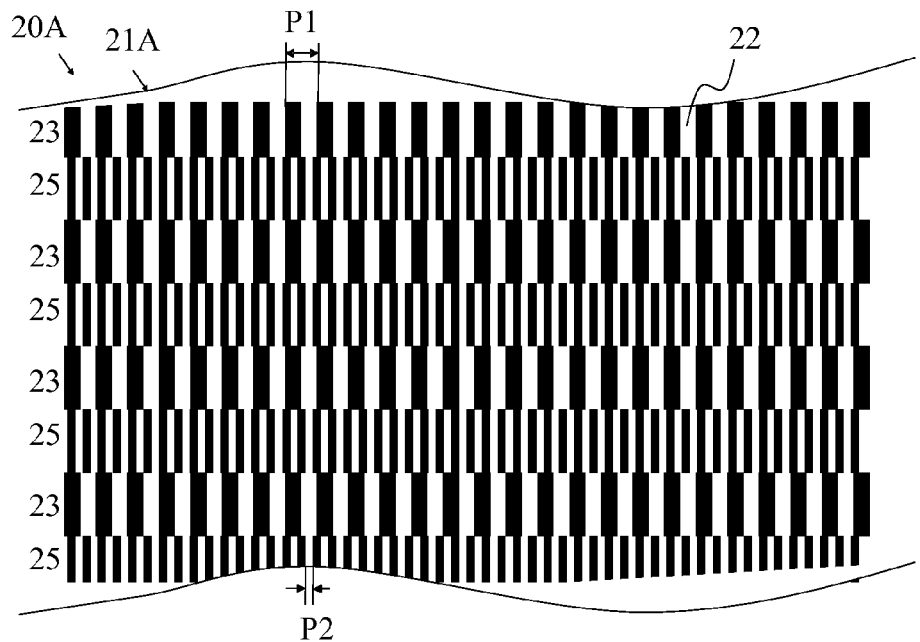
FIG. 3 is a partially enlarged view of tracks on a scale in Embodiment 1.

FIG. 3 illustrates a partially enlarged view of the track 21A. On the track 21A, the first patterns 23 and the second patterns 25 as two types of periodic patterns whose pitches (periods) are different from each other are alternately arranged in the Y direction orthogonal to the X direction that is the movement direction of the scale 20A. In this embodiment, the pitch of each second pattern 25 is smaller than that of each first pattern 23. In FIG. 3, each black portion is a reflective area which reflects light and is formed by the reflective film. On the other hand, each white portion is a non-reflective portion 22 which transmits or absorbs the light and is constituted by a surface of the light-transmissive substrate.

More specifically, the first pattern 23 is constituted by the reflective portions arranged in the X direction at the first pitch P1 of 256 μm and the non-reflective portions each arranged between the reflective portions. The first pattern 23 modulates the light projected thereto at a modulation period corresponding to the first pitch P1 and provides a signal period (first period) corresponding to the first pitch P1 to the encoder signal from the light-receiving element array 16A which receives (detects) the pattern image formed by the modulated light. The first pattern 23 has in the Y direction a width of 50 μm.

On the other hand, the second pattern 25 is constituted by the reflective portions arranged in the X direction at the second pitch P2 of 124.87805256 μm and the non-reflective portions arranged between the reflective portions. The second pattern 25 modulates the light projected thereto at a modulation period corresponding to the second pitch P2 and provides a signal period (second period) corresponding to the second pitch P2 to the encoder signal from the light-receiving element array 16A which receives (detects) the pattern image formed by the modulated light. The second pattern 25 has in the Y direction a width of 50 μm.

Figure 4:
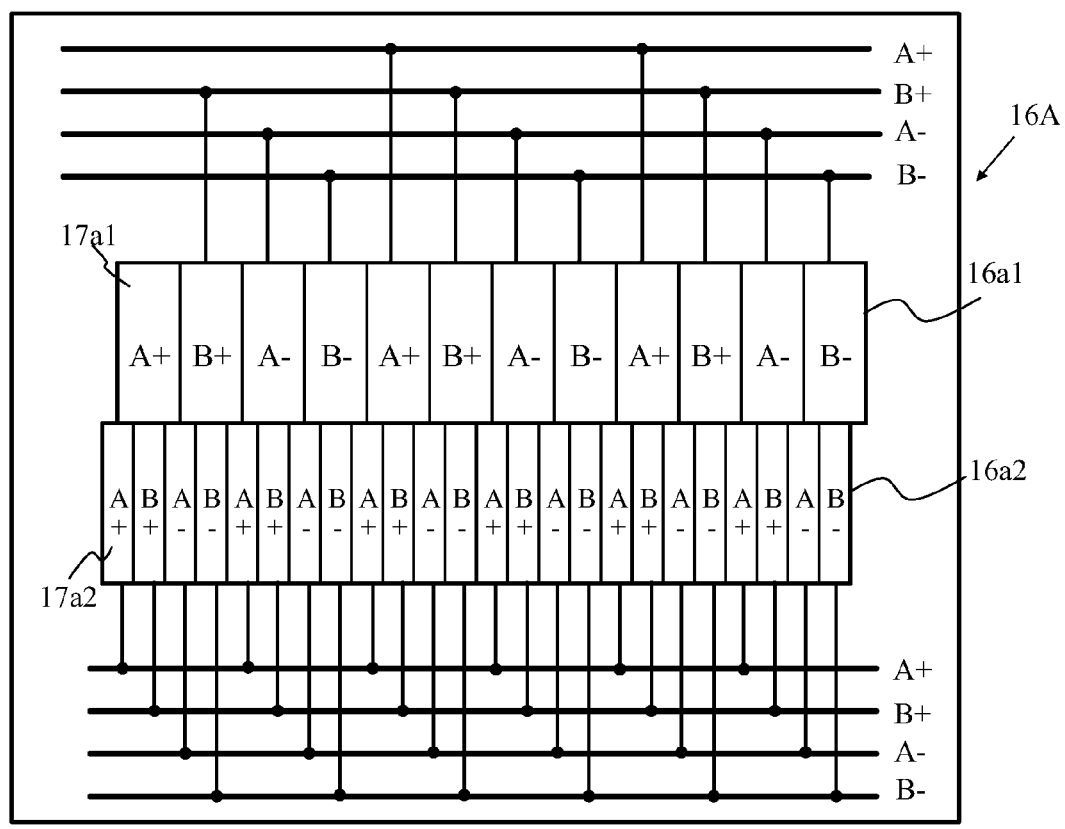
FIG. 4 is a diagram illustrating a light-receiving surface of a light-receiving element array provided to the sensor in Embodiment 1.

FIG. 4 illustrates a light-receiving surface of the light-receiving element array 16A. The light-receiving element array 16A includes two rows of light-receiving element arrays arranged in the Y direction, that is, a first light-receiving element array 16a1 and a second light-receiving element array 16a2. The first light-receiving element array 16a1 is constituted by multiple light-receiving elements 17a1 arrayed in the position detection direction (X direction), and the second light-receiving element array 16a2 is constituted by multiple light-receiving elements 17a2 arrayed in the position detection direction.

The first light-receiving element array 16a1 provided to detect the first patterns 23 is constituted by 12 light-receiving elements 17a1 arrayed in the X direction at a pitch (detection period) of 128 μm. Each light-receiving element 17a1 has a width X_pd of 128 μm in the X direction and a width Y_pd of 800 μm in the Y direction. As described above, since approximately-two-fold magnified images of each first pattern 23 and each second pattern 25 on the scale 20A are projected on the light-receiving element array 16A, a detection range (first detection range) of the first light-receiving element array 16a1 in the Y direction is 400 μm. Therefore, the first detection range on the scale 20A includes four rows of the first patterns 23 and four rows of the second patterns 25 (eight rows in total), each pattern having the width of 50 μm in the Y direction.

On the other hand, the second light-receiving element array 16a2 is provided to detect the second patterns 25 and is constituted by 24 light-receiving elements 17a2 arrayed in the X direction at a pitch (a detection period) of 64 μm. Each light-receiving element 17a2 has a width X_pd of 64 μm in the X direction and a width Y_pd of 800 μm in the Y direction. For the above-mentioned reason, a detection range (second detection range) of the second light-receiving element array 16a2 on the scale 20A in the Y direction is 400 μm. Therefore, the second detection range on the scale 20A also includes four rows of the first patterns 23 and four rows of the second patterns 25 (eight rows in total), each pattern having the width of 50 μm in the Y direction. The second light-receiving element array 16a2 is arranged with an offset of 16 μm in the X direction with respect to the first light-receiving element array 16a1.

The 12 light-receiving elements 17a1 which constitute the first light-receiving element array 16a1 are cyclically allocated to four phases A+, B+, A− and B−. Outputs from the light-receiving elements 17a1 allocated to the phases A+, B+, A− and B− are input to four initial amplifiers (not illustrated) connected respectively to an A+ terminal, a B+ terminal, an A− terminal and a B− terminal which are first output terminals of the light-receiving IC 14A. The four initial amplifiers outputs sinusoidal outputs S1(A+), S1(B+), S1(A−) and S1(B−) of four phases. The four-phase sinusoidal outputs S1(A+), S1(B+), S1(A−) and S1(B−) have phase differences from one another. When S1(A+) is regarded as a reference (0 degree), S1(B+) has a phase difference of approximately +90 degrees from the reference, S1(A−) has a phase difference of approximately +180 degrees therefrom, and S1(B−) has a phase difference of approximately +270 degrees therefrom.

Similarly, the 24 light-receiving elements 17a2 which constitute the second light-receiving element array 16a2 are cyclically allocated to four phases A+, B+, A− and B−. Outputs from the light-receiving elements 17a2 allocated to the phases A+, B+, A− and B− are input to four initial amplifiers (not illustrated) respectively connected to an A+ terminal, a B+ terminal, an A− terminal and a B− terminal which are second output terminals of the light-receiving IC 14A. The four initial amplifiers outputs sinusoidal outputs S2(A+), S2(B+), S2(A−) and S2(B−) of four phases. The four-phase sinusoidal outputs S2(A+), S2(B+), S2(A−) and S2(B−) have phase differences from one another. When S2(A+) is regarded as a reference (0 degree), S2(B+) has a phase difference of approximately +90 degrees from the reference, S2(A−) has a phase difference of approximately +180 degrees therefrom, and S2(B−) has a phase difference of approximately +270 degrees therefrom.

The amplified outputs from the first and second light-receiving element arrays 16a1 and 16a2 are input to the signal processing circuit 40 to be converted thereby into position information.

The first signal acquirer 41 of the signal processing circuit 40 performs a calculation of following expression (1) on the four-phase sinusoidal outputs S1(A+), S1(B+), S1(A−) and S1(B−) to produce first two-phase sinusoidal signals (first periodic signals) S1(A) and S1(B) whose direct current components have been removed.

$$S1(A)=S1(A+)-S1(A-)$$

$$S1(B)=S1(B+)-S1(B-) \quad (1)$$

Similarly, the second signal acquirer 42 performs a calculation of following expression (2) on the four-phase sinusoidal outputs S2(A+), S2(B+), S2(A−) and S2(B−) to produce second two-phase sinusoidal signals (second periodic signals) S2(A) and S2(B) whose direct current components have been removed.

$$S2(A)=S2(A+)-S2(A-)$$

$$S2(B)=S2(B+)-S2(B-) \quad (2)$$

Subsequently, the correction value calculator 43 calculates correction values from the second sinusoidal signals S2(A) and S2(B) acquired by the second signal acquirer 42. Specifically, the correction value calculator 42 performs a calculation of following expression (3) by using the second sinusoidal signal S2(A) to calculate correction signals (hereinafter referred to as "correction values") δS1(A) and δS1(B). In expression (3), η denotes a coefficient indicating a ratio of signal leakage (crosstalk). In this embodiment, the coefficient η is 0.055. That is, the correction value calculator 43 produces, as the correction values, periodic signals acquired by multiplying the second periodic signals by the predetermined coefficient.

$$\delta S1(A)=\eta \cdot S2(A)$$

$$\delta S1(B)=-\eta \cdot S2(A) \quad (3)$$

Next, the correction processor 44 performs calculation for a correction process by using following expression (4). That is, the correction processor 44 produces first corrected sinusoidal signals S1(A)' and S1(B)' by using the first sinusoidal signals S1(A) and S1(B) and the correction values δS1(A) and δS1(B).

$$S1(A)'=S1(A)-\delta S1(A)$$

$$S1(B)'=S1(B)-\delta S1(B) \quad (4)$$

Subsequently, the phase calculator 45 performs a calculation of following expression (5) by using the first corrected sinusoidal signals S1(A)' and S1(B)' thus acquired to acquire a phase Φ1 corresponding to a phase of a modulation component caused by the first pattern 23. In expression (5), A TAN 2[Y, X] denotes an arctangent function which determines a quadrant of a phase of Y and X and converts the phase into a phase from 0 to 2π.

$$\Phi 1 = A\ TAN\ 2[S1(A)', S1(B)'] \quad (5)$$

Figure 5:
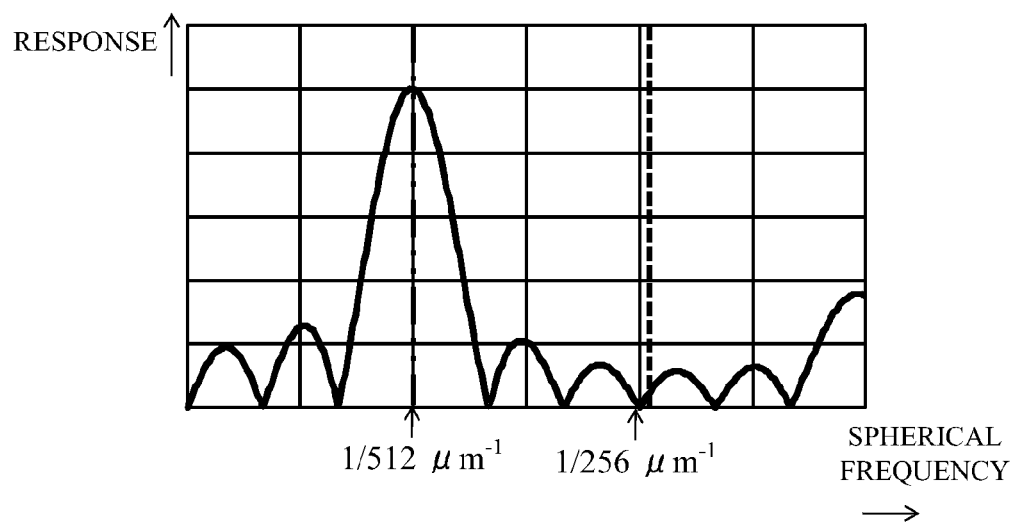
FIG. 5 is a graph illustrating a spatial frequency response of the light-receiving element array in Embodiment 1.

Description will now be made of an object and an effect of the correction process. FIG. 5 illustrates a spatial filter characteristic showing response of S1(A) and S1(B) with respect to spatial frequency of a light quantity distribution of light received by the first light-receiving element array 16a1. FIG. 5 illustrates a spatial frequency corresponding to the two-fold magnified image of the first pattern 23 having the first pitch P1 on the scale 20A, by a dashed-two dotted line and illustrates a spatial frequency corresponding to the two-fold magnified image of the second pattern 25 having the second pitch P2 thereon by a dotted line. As understood from FIG. 5, the response to an image having a spatial frequency of $1/256\ \mu m^{-1}$ on the light-receiving surface is attenuated by a spatial filter effect of the light-receiving element array 16A.

However, the second pitch P2 (=124.87805256 μm) does not perfectly coincide with 128 μm in this embodiment, and therefore the two-fold magnified image (that is, the spatial frequency indicated by the dotted line) does not strictly coincide with the spatial frequency of $1/256\ \mu m^{-1}$, which decreases the attenuation by the spatial filter effect.

Figures 6A, 6B:
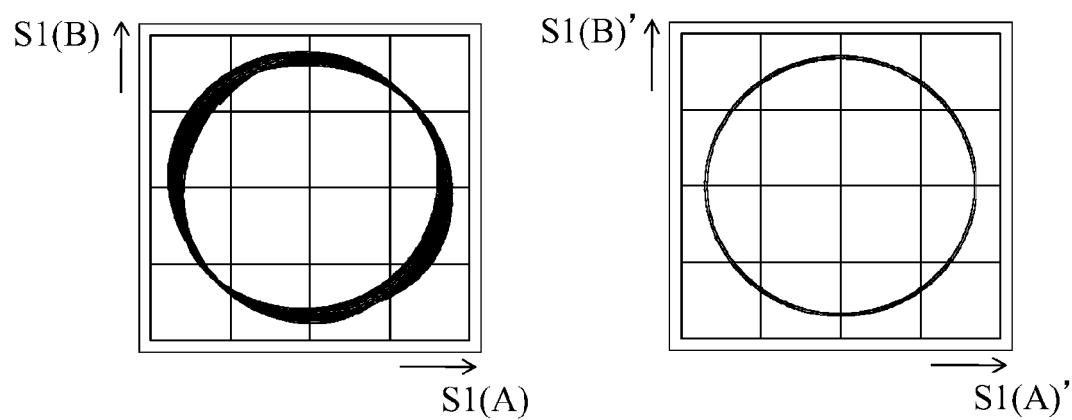
FIGS. 6A and 6B are graphs illustrating Lissajous waveforms before and after correction in Embodiment 1.

With the above spatial filter characteristic, when the scale 20A is displaced, a Lissajous waveform shown in FIG. 6A is obtained. In FIG. 6A, a horizontal axis indicates S1(A), and a vertical axis indicates S1(B). Although it is desirable in theory that the first sinusoidal signals S1(A) and S1(B) be accurate sinusoidal waves each corresponding to the first pitch (first period) P1, a modulation component (hereinafter referred to as "a P2 modulation component") caused by the second pattern 25 having the second pitch (second period) P2 cannot be fully removed in fact, and thus an error occurs with respect to such accurate sinusoidal waves. This error causes the Lissajous waveform to have a shape deviating from a perfect circle.

The correction process in this embodiment aims to reduce (more desirably, remove) this P2 modulation component that is an error component and thereby make the first sinusoidal signals S1(A) and S1(B) more accurate sinusoidal waves. In other words, this correction process aims to reduce a signal component changing corresponding to the second period of the second pattern 25 contained in the first periodic signal. FIG. 6B illustrates a Lissajous waveform of the first corrected sinusoidal signals S1(A)' and S1(B)' obtained by the correction process. As a result of the correction process, the first sinusoidal signals S1(A) and S1(B) are brought into more accurate sinusoidal waves and the Lissajous waveform is also brought into a more perfect circle. Therefore, using the first corrected sinusoidal signals S1(A)' and S1(B)' enables position detection with higher accuracy.

Next, description will be made of a method of setting the coefficient η. In the following description, a modulation component caused by the first pattern 23 having the first pitch P1 is referred to as "a P1 modulation component". First, from arrangement design values of the first and second light-receiving element arrays 16a1 and 16a2, a calculation is made of response characteristics of the P1 modulation component and the P2 modulation component to the first sinusoidal signals S1(A) and S1(B) and the second sinusoidal signals S2(A) and S2(B). The response characteristics can be calculated by performing a convolution operation of a sinusoidal wave having a corresponding frequency and an output sensitivity distribution of the light-receiving element array 16A. The response characteristics may, however, be calculated by other calculation methods; for example, a fast Fourier transform may be performed on a sensitivity distribution of the light-receiving element array 16A to calculate the response characteristics.

Next, from the calculated response characteristics, setting of the coefficient is made as follows. An amplitude ratio between the response of the P2 modulation component to the second sinusoidal signal S2(A) and the response of the P2 modulation component to the first sinusoidal signals S1(A) and S1(B) is defined as the above-described coefficient n. Alternatively, the coefficient η may be set from the response characteristics calculated by actually measuring waveforms of the first sinusoidal signals S1(A) and S1(B) and the second sinusoidal signals S2(A) and S2(B) and separating the waveforms by frequency with a Fourier transform.

Subsequently, description will be made of a relative phase relation between a phase of the P2 modulation component contained in the second sinusoidal signal S2(A) and a phase of the P2 modulation components contained in the first sinusoidal signals S1(A) and S1(B). In this embodiment, as described above, the second light-receiving element array 16a2 is arranged with the offset of 16 μm in the X direction with respect to the first light-receiving element array 16a1. This arrangement results in approximate coincidence of the phase of the P2 modulation component contained in S2(A) with that of the P2 modulation component contained in S1(A) and further results in approximate 180-degree inversion of the phase of the P2 modulation component contained in S2(A) with respect to that of the P2 modulation component contained in S1(B). This setting only requires, as the calculation for the correction process, a simple multiplication as expressed by expression (3), which enables a significant reduction in calculation amount.

Next, description will be made of a process to calculate a phase Φ2 corresponding to the phase of the P2 modulation component. In this embodiment, the detection period (128 μm) of the second light-receiving element array 16a2 is slightly different from the period (second pitch P2) of the second pattern 25 on the scale 20A. For this reason, it is desirable to perform a process to correct a relative phase difference between the two-phase second sinusoidal signals S2(A) and S2(B). This phase difference correction method will be described below.

First, the two-phase second sinusoidal signals S2(A) and S2(B) each containing a relative phase difference error (also referred to as "an error component) e are represented by following expression (6) where θ represents their phase:

$$S2(A) = \cos(\theta + e/2)$$

$$S2(B) = \sin(\theta - e/2) \quad (6)$$

From expression (6), adding and subtracting the two-phase second sinusoidal signals S2(A) and S2(B) to and from each other enables separating the error component e as shown in following expression (7).

$$S2(A) + S2(B) = 2 \cdot \cos(\theta - \pi/4)\sin(e/2 - \pi/4)$$

$$-S2(A) + S2(B) = 2 \cdot \sin(\theta - \pi/4)\cos(e/2 - \pi/4). \quad (7)$$

The phase calculator 45 performs a phase calculation as follows. The relative phase difference error e can be represented, from a design value, as $e = (1 - 128/124.87805) \cdot \pi$. The phase calculator 45 multiplies the adding and subtracting expressions shown as expression (7) by inverses of amplitude components of $2 \cdot \sin(e/2-\pi/4)$ and $2 \cdot \cos(e/2-\pi/4)$ included in expression (7) to calculate the two-phase second sinusoidal signals S2(A)' and S2(B)' whose phase difference error has been corrected as shown by following expression (8) In expression (8), $\phi$ represents $\theta-\pi/4$.

$$S2(A)'=(S2(A)+S2(B))/(2 \cdot \sin(e/2-\pi/4))=\cos \phi$$

$$S2(B)'=(-S2(A)+S2(B))/(2 \cdot \cos(e/2-\pi/4))=\sin \phi \quad (8)$$

The phase calculator 45 acquires, by a calculation of following expression (9) using the second corrected sinusoidal signals S2(A)' and S2(B)' thus acquired, a phase $\Phi 2$ corresponding the phase of the P2 modulation component.

$$\Phi 2 = A\ \text{TAN}\ 2[S2(A)', S2(B)'] \quad (9)$$

Next, the position calculator 46 acquires, by a calculation of following expression (10) using the phase $\Phi 1$ of the first modulation component and the phase $\Phi 2$ of the second modulation component described above a vernier signal Sv serving as an absolute position signal.

$$Sv = \Phi 2 - 2 \cdot \Phi 1 \quad (10)$$

In this calculation, the position calculator 46 repeatedly performs, when $Sv<0$, a calculation of $Sv=Sv+2\pi$ and repeatedly performs, when $Sv>2\pi$, a calculation of $Sv=Sv-2\pi$ to convert the vernier signal Sv into an output range from 0 to $2\pi$. A relation between the phases $\Phi 1$ and $\Phi 2$ of the P1 and P2 modulation components and a position x in the X direction can be represented by following expression (11).

$$\Phi 1 = 2\pi \cdot x/P1$$

$$\Phi 2 = 2\pi \cdot x/P2 \quad (11)$$

Since a period Tv of the vernier signal Sv is equal to a position variation amount in the X direction in which a result of $\Phi 2 - 2 \cdot \Phi 1$ varies from 0 to $\pm 2\pi$, the period Tv can be represented by following expression (12).

$$\Phi 2 - 2 \cdot \Phi 1 = 2\pi \cdot Tv/P2 - 2 \cdot 2\pi \cdot Tv/P1 = \pm 2\pi$$

$$Tv = |P1 \cdot P2/(P1 - 2 \cdot P2)| \quad (12)$$

Figure 7A:
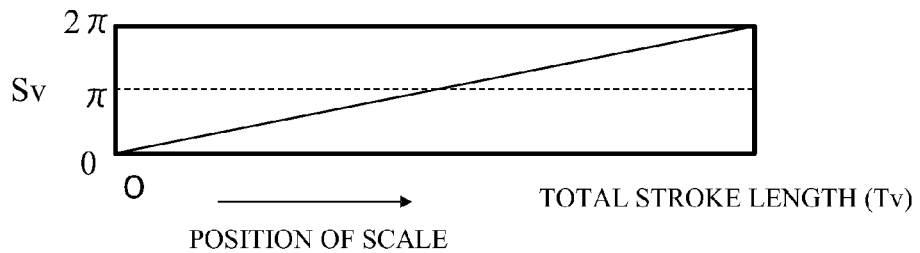
FIGS. 7A and 7B are diagrams illustrating a relation between a detection signal and position of the scale in Embodiment 1.

FIG. 7A illustrates a relation between the vernier signal Sv and the position of the scale 20A thus acquired. In this embodiment, the period Tv of the vernier signal Sv calculated from expression (12) is 5.12 mm, which is a total stroke length in which the position of the scale 20A can be detected.

Figure 7B:
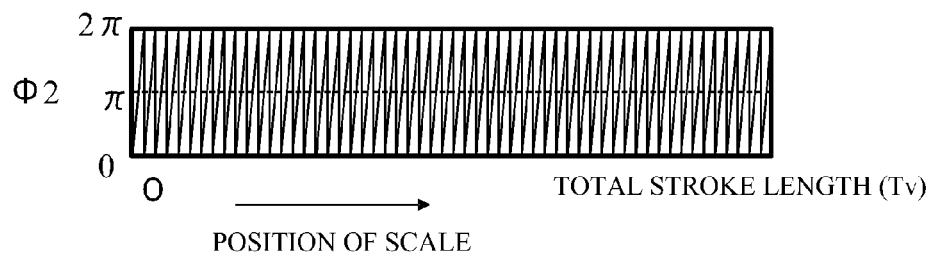

On the other hand, FIG. 7B illustrates a relation between the phase $\Phi 2$ and the position of the scale 20A. The phase $\Phi 2$ is used as a relative position signal (incremental signal) indicating a relative position of the scale 20A, and the vernier signal Sv is used as an absolute position signal indicating an absolute position of the scale 20A.

Embodiment 2

Figure 8:
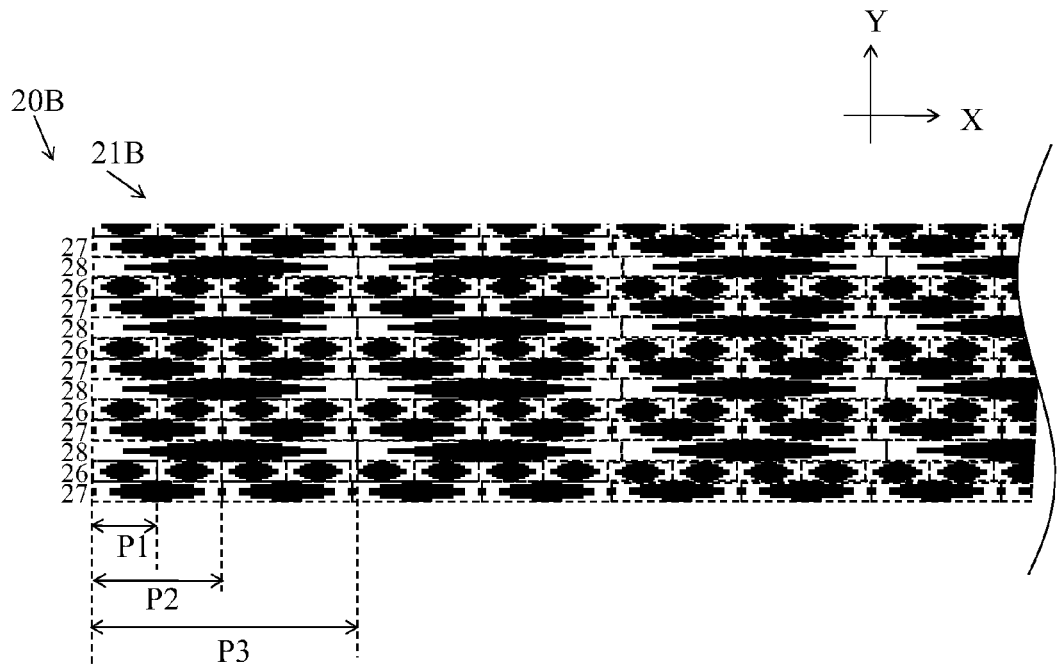
FIG. 8 is a diagram illustrating tracks on a scale in Embodiment 2 of the present invention.

Next, description will be made of a second embodiment (Embodiment 2) of the present invention. In Embodiment 2, a track 21B illustrated in FIG. 8 is formed on a scale 20B. In addition, a light-receiving IC 14B (not illustrated in FIG. 8) is used instead of the light-receiving IC 14A described in Embodiment 1.

On the track 21B illustrated in FIG. 8, three types of periodic patterns, namely, a first pattern 26, a second pattern 27 and a third pattern 28 whose pitches (periods) are different from each other are periodically (cyclically) arranged in a direction (Y direction) orthogonal to a movement direction (X direction) of the scale 20B.

Figure 9A:
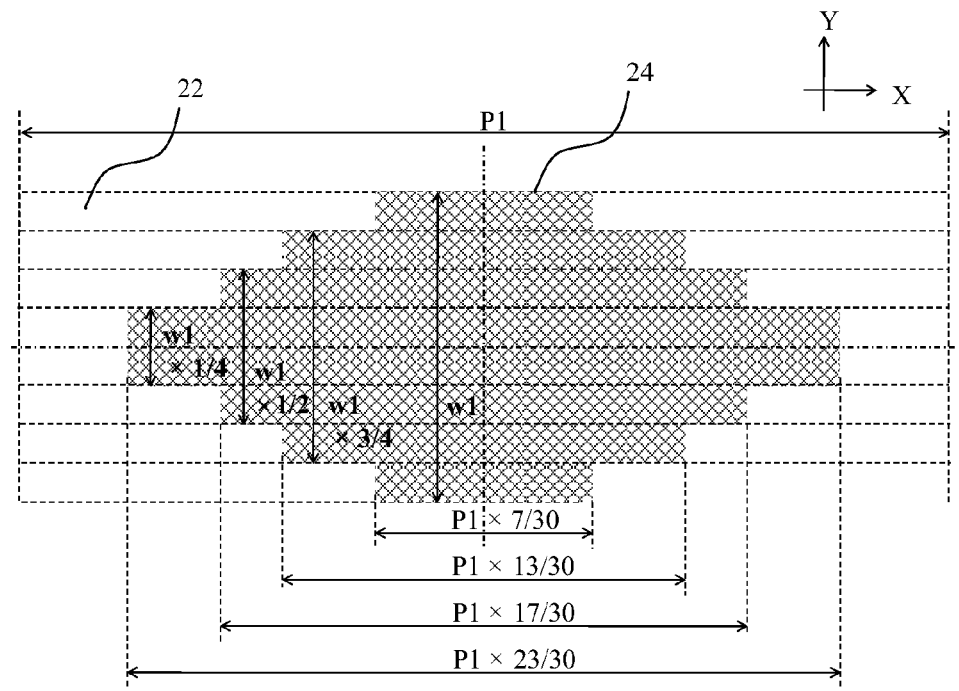
FIGS. 9A to 9C are partially enlarged views of the tracks illustrated in FIG. 8.

FIG. 9A is an enlarged view of a one period part of the first pattern 26 in the X direction. The first pattern 26 is formed such that the one period parts are periodically arranged at a first pitch P1 (=127.204969 μm) in the X direction. The one period part is constituted by a reflective portion 24 (illustrated as a black area in the figure) which is formed by a reflective film reflecting light and a non-reflective portion 22 (illustrated as a white area in the figure). The first pattern 26 has a width W1 of 50 μm in the Y direction.

In the one period part, the reflective portion 24 has different lengths in the X direction at its positions in the Y direction. In a region in which a distance from a center in the Y direction (hereinafter referred to as "a Y-width center") is equal to or shorter than W1/8, a length (hereinafter referred to as "an X length") of the reflective portion 24 in the X direction is $P1 \cdot 23/30$. In a region in which the distance from the Y-width center is W1/8 to W1/4, the X length of the reflective portion 24 is $P1 \cdot 17/30$. In a region in which the distance from the Y-width center is W1/4 to W1·3/8, the X length of the reflective portion 24 is $P1 \cdot 13/30$. In a region in which the distance from the Y-width center is W1·3/8 to W1/2, the X length of the reflective portion 24 is $P1 \cdot 7/30$.

Figure 9B:
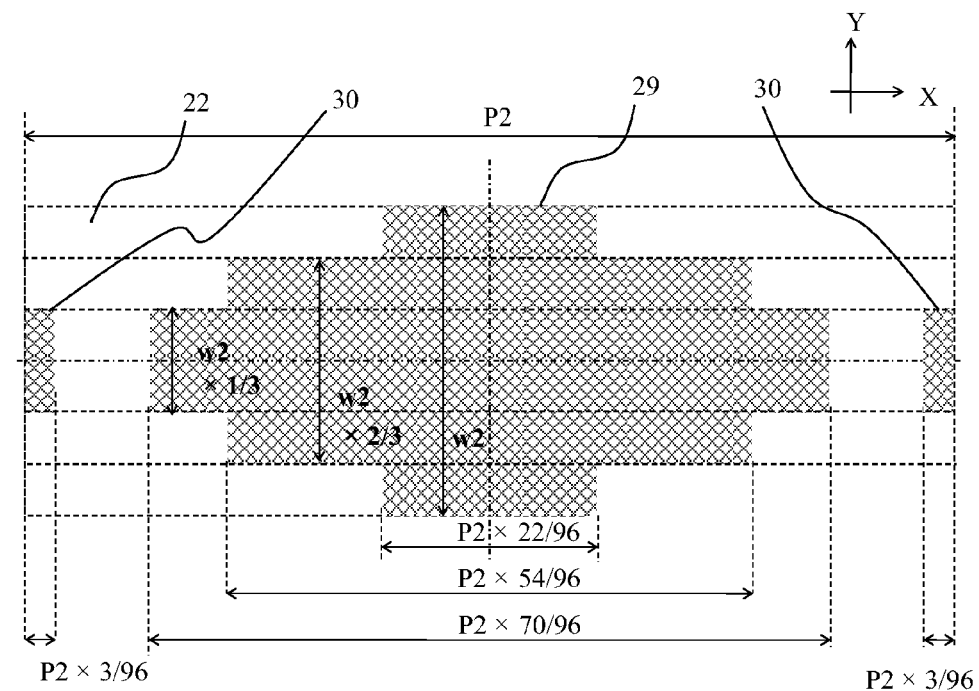

FIG. 9B is an enlarged view of a one period part of the second pattern 27 in the X direction. The second pattern 27 is formed such that the one period parts are periodically arranged at a second pitch P2 (=256 μm) in the X direction. The one period part is constituted by reflective portions 29 and 30 (illustrated as black areas in the figure) each formed by a reflective film reflecting light and a non-reflective portion 22 (illustrated as a white area in the figure). The second pattern 27 has a width W2 of 50 μm in the Y direction.

In the one period part, the reflective portion 29 has different lengths in the X direction at its positions in the Y direction. On the other hand, the reflective portion 30 is formed only in each of partial areas of the one period part in the Y direction. In a region in which the distance from the Y-width center is equal to or shorter than W2/6, the X length of the reflective portion 29 is $P2 \cdot 7/96$. In this region, the reflective portion 30 is formed with a length of $P2 \cdot 3/96$ from both ends of the one period part in the X direction. In a region in which the distance from the Y-width center is W2/6 to W2·1/3, the X length of the reflective portion 29 is $P2 \cdot 54/96$. In a region in which the distance from the Y-width center is W2·1/3 to W2·1/2, the X length of the reflective portion 29 is $P2 \cdot 22/96$.

Figure 9C:
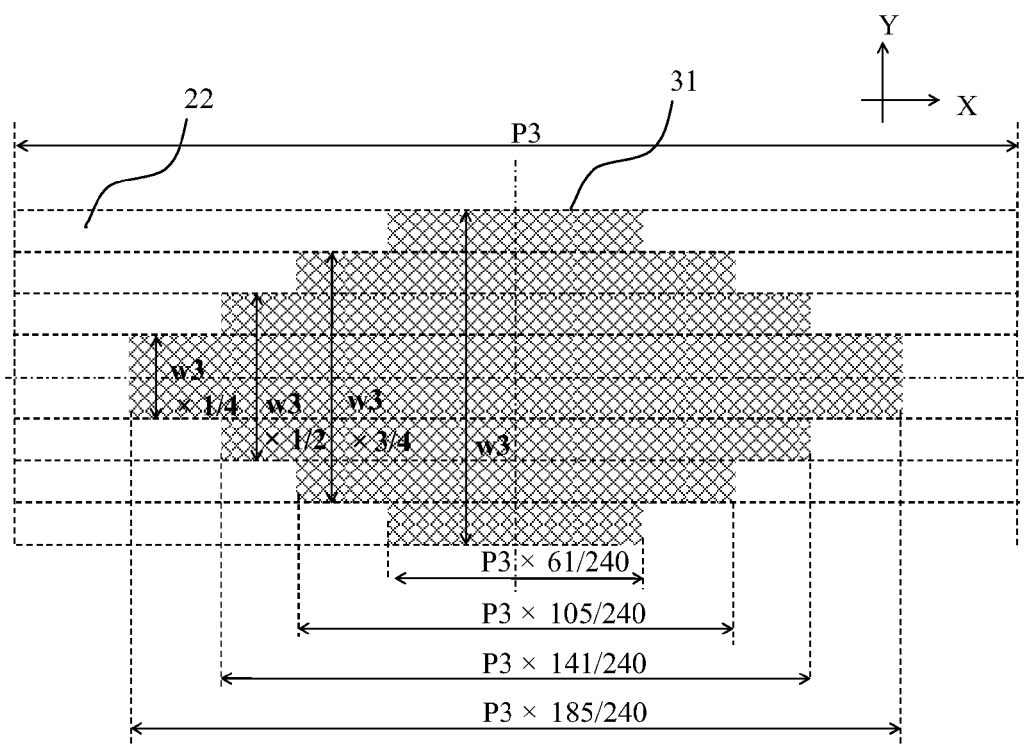

FIG. 9C is an enlarged view of a one period part of the third pattern 28 in the X direction. The third patterns 27 are formed such that the one period parts are periodically arranged at a third pitch (=553.513514 μm) in the X direction. The one period part is constituted by a reflective portion 31 (illustrated as a black area in the figure) formed by a reflective film reflecting light and a non-reflective portion 22 (illustrated as a white area in the figure). The third pattern 28 has a width W3 of 50 μm in the Y direction is 50 μm.

In the one period part, the reflective portion 31 has different lengths in the X direction at its positions in the Y direction. In a region in which the distance from the Y-width center is equal to or shorter than W3/8, the X length of the reflective portion 31 is $P3 \cdot 185/240$. In a region in which the distance from the Y-width center is W3/8 to W3/4, the X length of the reflective portion 31 is $P3 \cdot 141/240$. In a region in which the distance from the Y-width center is W3/4 to W3·3/8, the X length of the reflective portion 31 is $P3 \cdot 105/240$.

In a region in which the distance from the Y-width center is W3·3/8 to W3/2, the X length of the reflective portion 31 is P3·61/240.

Figure 10:
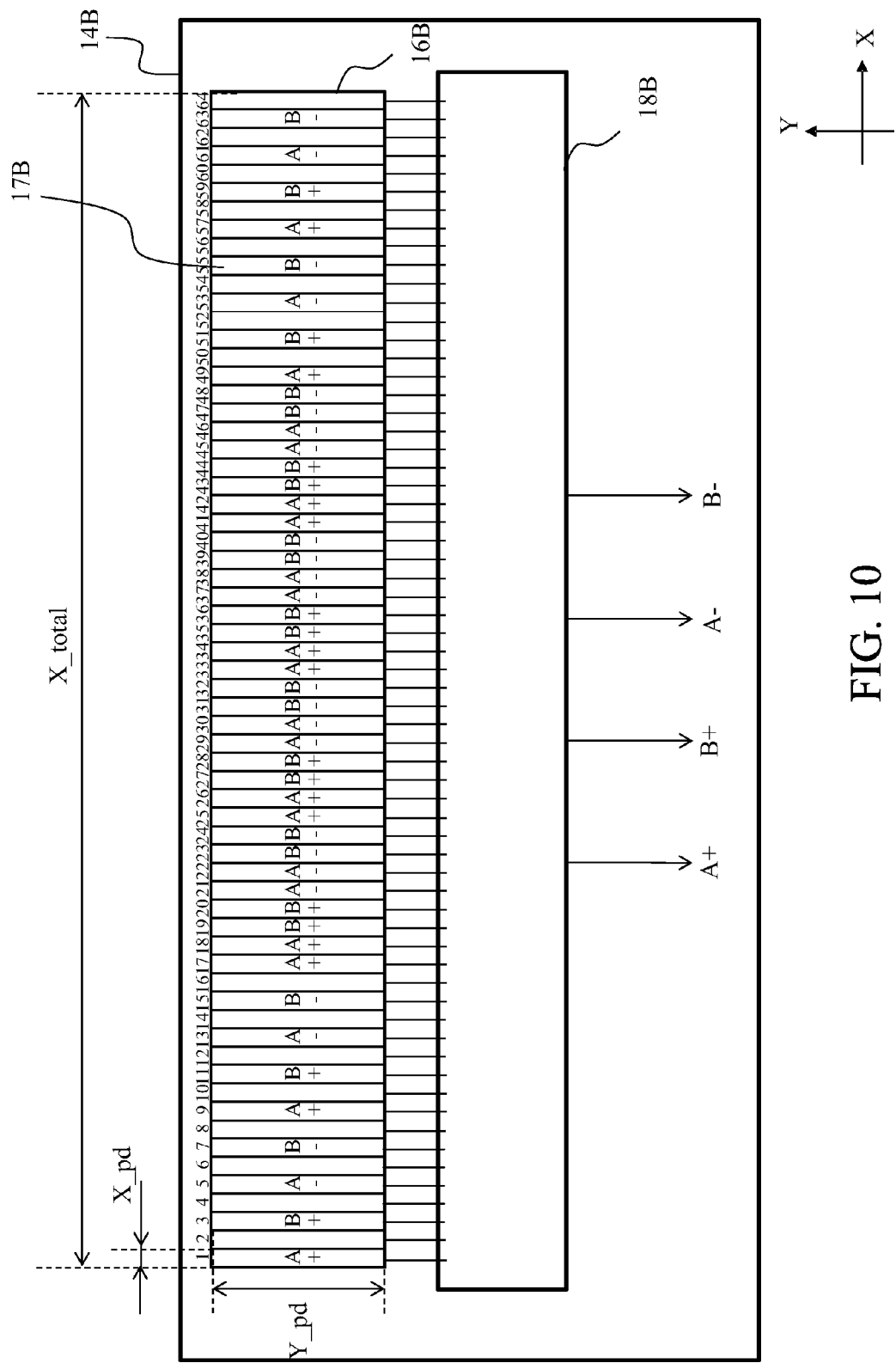
FIGS. 10 to 12 are diagrams illustrating a light-receiving surface of a light-receiving element array in Embodiment 2 (and Embodiment 3).
Figure 11:
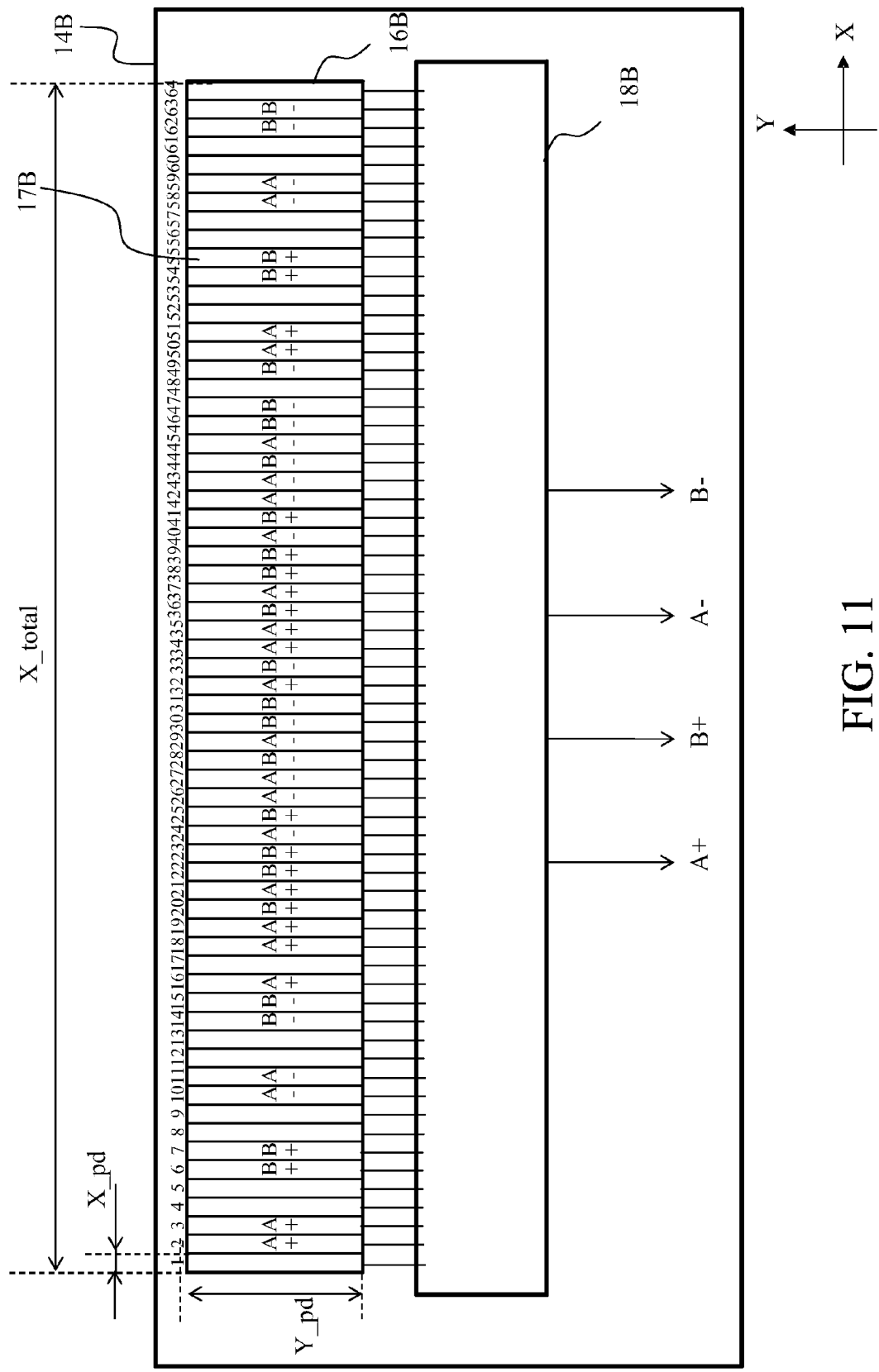
Figure 12:
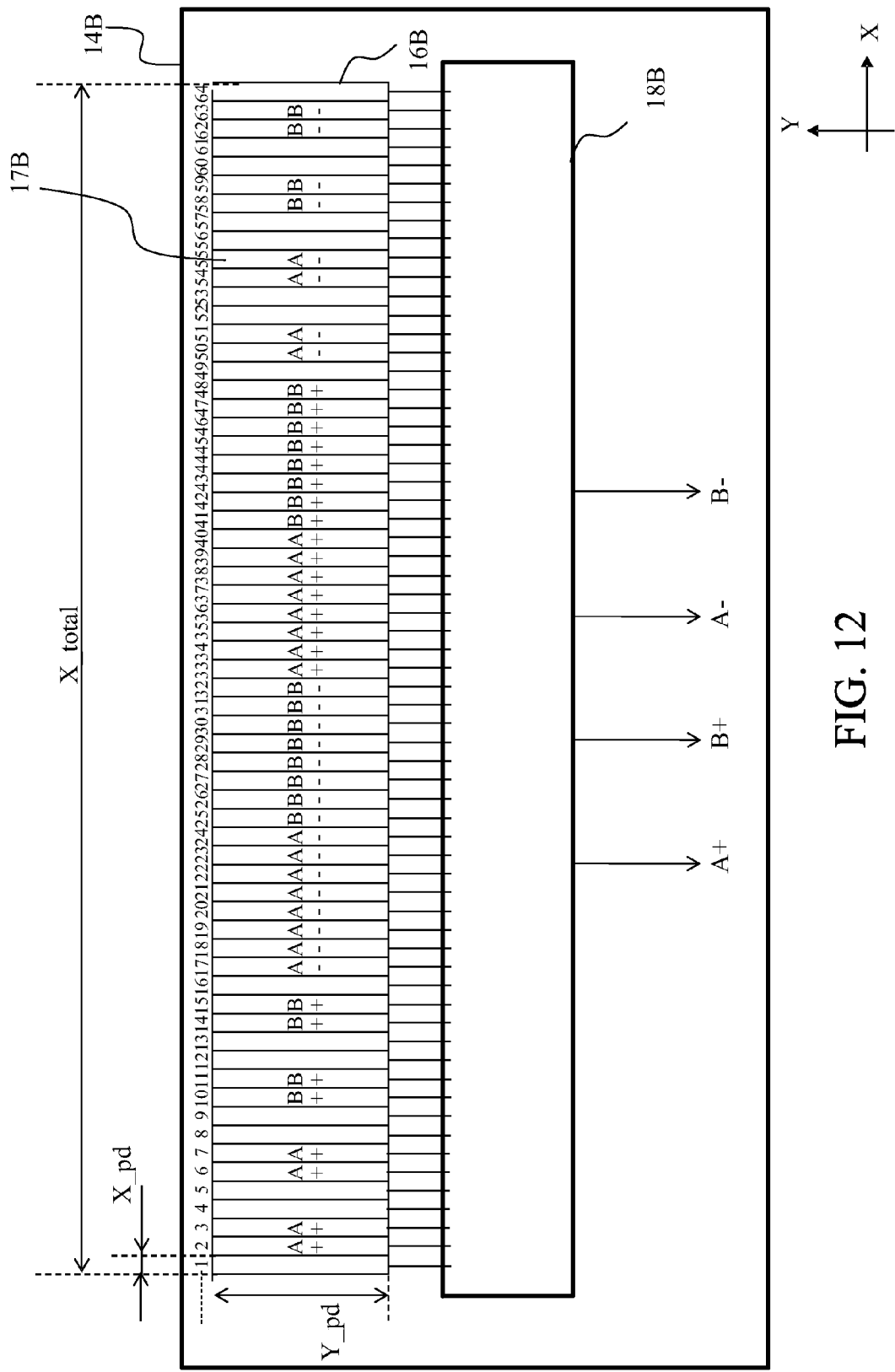

FIGS. 10, 11 and 12 illustrates arrangements of light-receiving elements in a light-receiving surface of a light-receiving element array 16B provided in the light-receiving IC 14B. The light-receiving element array 16B is constituted by 64 light-receiving elements 17B arranged at a pitch of 32 μm in the X direction. Each light-receiving element 17B has a width X_pd of 32 μm in the X direction and a width Y_pd of 900 μm in the Y direction. The light-receiving element array 16B has a total length X_total of 2048 μm in the X direction.

Since a two-fold magnified image of each pattern is projected on the scale 20B similarly to Embodiment 1, a detection range on the scale 20B is 450 μm in the Y direction and 1024 μm in the X direction. Thus, the detection range on the scale 20B includes three rows of the first pattern 26, three rows of the second pattern 27 and three rows of the third patterns 28 in the Y direction; each pattern has the above-mentioned width of 50 μm in the Y direction.

The 64 light-receiving elements 17B constituting the first light-receiving element array 16B are cyclically allocated to four phases A+, B+, A− and B− with an allocation period corresponding to a detection period for detecting selected one of the first, second and third patterns 26, 27 and 28. The allocation period corresponds to number of the light-receiving elements which are continuously arranged in the X direction and whose outputs are electrically added to one another. That is, changing the allocation period changes a length (detection period) of a light-receiving region in the X direction where one output is extracted from the light-receiving element arrays 16B. The allocation period is changed (switched) by an operation of a switching circuit 18B to which light-receiving elements 17B are connected; the operation of the switching circuit 18B is performed in response to input of a setting signal (2-bit signal in this embodiment) from the signal processing circuit 40. The switching circuit 18B inputs respective outputs from the light-receiving elements 17B allocated to the phases A+, B+, A− and B− to four initial amplifiers (not illustrated) connected to terminals A+, B+, A− and B− which are output terminals of the light-receiving IC 14B.

When the setting signal from the signal processing circuit 40 is "11", the detection period is set to one corresponding to the period (256 μm) of the two-fold magnified image of the first pattern 26 as illustrated in FIG. 10, which enables separating a sinusoidal signal corresponding to the first pattern 26. When the setting signal is "01", the detection period is set to one corresponding to the period (512 μm) of the two-fold magnified image of the second pattern 27 as illustrated in FIG. 11, which enables separating a sinusoidal signal corresponding to the second pattern 27. When the setting signal is "10", the detection period is set to one corresponding to the period (1024 μm) of the two-fold magnified image of the third pattern 28 as illustrated in FIG. 12, which enables separating a sinusoidal signal corresponding to the third pattern 28.

The four initial amplifiers outputs sinusoidal outputs S1(A+), S1(B+), S1(A−) and S1(B−) of four phases. The four-phase sinusoidal outputs S1(A+), S1(B+), S1(A−) and S1(B−) have phase differences from one another. When S1(A+) is regarded as a reference (0 degree), S1(B+) has a phase difference of approximately +90 degrees from the reference, S1(A−) has a phase difference of approximately +180 degrees therefrom, and S1(B−) has a phase difference of approximately +270 degrees therefrom.

The signal processing circuit 40 performs calculation using expression (1) shown in Embodiment 1 for the four-phase sinusoidal outputs S1(A+), S1(B+), S1(A−) and S1(B−) to produce two-phase sinusoidal signals S(A) and S(B) whose direct current components have been removed. The two-phase sinusoidal signals S(A) and S(B) provided when the setting signal input to the switching circuit 18B is "11" are referred to as first sinusoidal signals S1(A) and S1(B). Similarly, the sinusoidal signals S(A) and S(B) provided when the setting signal is "01" are referred to as second sinusoidal signals S2(A) and S2(B). Furthermore, the sinusoidal signals S(A) and S(B) provided when the setting signal is "10" are referred to as third sinusoidal signals S3(A) and S3(B).

Subsequently, description will be made of a procedure for calculating the correction values by the correction value calculator 43. In this embodiment, the correction value calculator 43 performs correction processes for four types of signal leakage (crosstalk) shown below.

(1) leakage of the P2 modulation component to S1(A) and S1(B)

(2) leakage of the P1 modulation component to S2(A) and S2(B)

(3) leakage of the P2 modulation component to S3(A) and S3(B)

(4) leakage of a second-order harmonic modulation component of the P1 modulation component to S3(A) and S3(B)

As for the correction process for the signal leakage (1), S1(A) and S1(B) correspond to the first periodic signals, and S2(A) and S2(B) correspond to the second periodic signals. On the other hand, as for the correction process for the signal leakage (2), S2(A) and S2(B) correspond to the first periodic signals, and S1(A) and S1(B) correspond to the second periodic signals. Moreover, as for the correction process for the signal leakage (3), S3(A) and S3(B) correspond to the first periodic signals, and S2(A) and S2(B) correspond to the second periodic signals. Furthermore, as for the correction process for the signal leakage (4), S3(A) and S3(B) correspond to the first periodic signals, and S1(A) and S1(B) correspond to the second periodic signals.

The correction value calculator 43 performs a calculation of following expression (13) by using amplitude ratios $\eta 1$ to $\eta 4$ and phase difference components $\gamma 1(A)$ to $\gamma 4(B)$ described later to calculate correction values $\delta S1(A)$, $\delta S1(B)$, $\delta S2(A)$, $\delta S2(B)$, $\delta S3(A)$ and $\delta S3(B)$. That is, the correction value calculator 43 calculates a phase ($\alpha 1$ or $\alpha 2$) of each of the second periodic signals and produces periodic signals, as correction values, which have phases obtained by adding the phase difference components $\gamma 1(A)$ to $\gamma 4(B)$ as predetermined shifts to the calculated phase $\alpha 1$ or $\alpha 2$.

$$\delta S1(A) = \eta 1 \times \cos(\alpha 2 + \gamma 1(A))$$

$$\delta S1(B) = \eta 1 \times \cos(\alpha 2 + \gamma 1(B))$$

$$\delta S2(A) = \eta 2 \times \cos(\alpha 1 + \gamma 2(A))$$

$$\delta S2(B) = \eta 2 \times \cos(\alpha 1 + \gamma 2(B))$$

$$\delta S3(A) = \eta 3 \times \cos(\alpha 2 + \gamma 3(A)) + \eta 4 \times \cos(2 \times \alpha 1 + \gamma 4(A))$$

$$\delta S3(B) = \eta 3 \times \cos(\alpha 2 + \gamma 3(B)) + \eta 4 \times \cos(2 \times \alpha 1 + \gamma 4(B)) \quad (13)$$

In expression (13), $$\alpha 1 = A\ \text{TAN}\ 2[S1(A), S1(B)];$$

$$\alpha 2 = A\ \text{TAN}\ 2[S2(A), S2(B)];\ \text{and}$$

$$\alpha 3 = A\ \text{TAN}\ 2[S3(A), S3(B)].$$

Next, the correction processor 44 performs calculation for the correction processes by using following expression (14), thereby calculating the corrected sinusoidal signals S1(A)', S1(B)', S2(A)', S2(B)', S3(A)' and S3(B)'.

$$S1(A)'=S1(A)-\delta S1(A)$$

$$S1(B)'=S1(B)-\delta S1(B)$$

$$S2(A)'=S2(A)-\delta S2(A)$$

$$S2(B)'=S2(B)-\delta S2(B)$$

$$S3(A)'=S3(A)-\delta S3(A)$$

$$S3(B)'=S3(B)-\delta S3(B) \tag{14}$$

Next, the phase calculator 45 performs a calculation of following expression (15) by using S1(A)', S1(B)', S2(A)', S2(B)', S3(A)' and S3(B)' to acquire phases $\Phi1$, $\Phi2$ and $\Phi3$ of signals respectively corresponding to the first, second and third patterns 26, 27 and 28

$$\Phi1 = A\ TAN\ 2[S1(A)',S1(B)']$$

$$\Phi2 = A\ TAN\ 2[S2(A)',S2(B)']$$

$$\Phi3 = A\ TAN\ 2[S3(A)',S3(B)'] \tag{15}$$

The first, second and third patterns 26, 27 and 28 have initial phases such that a relation of $\Phi1=\Phi2=\Phi3=0$ is satisfied at one end (X=0 mm) in the position detection direction.

In addition, prior to the calculation of expression (15), correcting a phase difference error between the two-phase signals with respect to S1(A)', S1(B)', S2(A)', S2(B)', S3(A)' and S3(B)' by using expression (8) shown in Embodiment 1 enables further improvement in accuracy.

Subsequently, the position calculator 46 calculates an absolute position. First, the position calculator 46 performs a calculation of following expression (16) to acquire phase signals (hereinafter also referred to as "phases") $\Phi a$ and $\Phi b$.

$$\Phi a = \Phi1 - 2 \cdot \Phi2$$

$$\Phi b = \Phi2 - 2 \cdot \Phi3 \tag{16}$$

In expression (16), the position calculator 46 repeatedly performs, when $\Phi a<0$, a calculation of $\Phi a=\Phi a+2\pi$ and repeatedly performs, when $\Phi a>2\pi$, a calculation of $\Phi a=\Phi a-2\pi$ to convert the phase $\Phi a$ into an output range from 0 to $2\pi$. The position calculator 46 also converts, in a similar manner, the phase $\Phi b$ into an output range from 0 to $2\pi$.

Signal periods Ta and Tb of the phases $\Phi a$ and $\Phi b$ in the X direction are Ta=20480 μm and Tb=3413.333 μm.

Next, the position calculator 46 performs a calculation of following expression (17) to synchronize an upper signal C with the phases $\Phi b$ of multiple periods, to calculate a current order in period of the phases $\Phi b$ from the upper signal C and to connect the phases $\Phi b$ together, thereby acquiring a middle signal M which is an absolute position signal having a position accuracy of $\Phi b$.

$$M=\{2\pi \cdot ROUND[(Ta/Tb \cdot C-\Phi b)/(2\pi)]+\Phi b\} \cdot Tb/Ta \tag{17}$$

In expression (17), ROUND[x] represents a function which converts x into an integer closest to x.

Next, the position calculator 46 performs a calculation of following expression (18) to synchronize the middle signal M with the phases $\Phi3$ of multiple periods, to calculate a current order in period of the phases $\Phi3$ from the middle signal M and to connect the phases $\Phi3$ together, thereby acquiring a lower signal F which is an absolute position signal having a position accuracy of $\Phi3$.

$$F=\{2\pi \cdot ROUND[(Ta/P3 \cdot M-\Phi3)/(2\pi)]+\Phi3\} \cdot P3/Ta \tag{18}$$

Furthermore, the position calculator 46 performs a calculation of following expression (19) to synchronize the lower signal F with the phases $\Phi1$ of multiple periods, to calculate a current order in period of the phases $\Phi1$ from the middle signal F and to connect the phases $\Phi1$ together, thereby acquiring an absolute position signal ABS having a position accuracy of $\Phi1$.

$$ABS=\{ROUND[(Ta/P1 \cdot F-\Phi1)/(2\pi)]+\Phi1/(2\pi)\} \cdot P1\ [\mu m] \tag{19}$$

Performing the above-mentioned synthesis process enables detecting an absolute position in a long stroke by using a highly accurate incremental pattern signal.

Description will now be made of a method of setting coefficients which are the amplitude ratios η1, η2, η3 and η4 and the phase difference components γ1(A), γ1(B), γ2(A), γ2(B), γ3(A), γ3(B), γ4(A) and γ4(B).

First, from arrangement design values for the respective allocation periods (detection periods) in the light-receiving element array 16B, a calculation is made of response characteristics of second-order harmonic modulation components having second-order harmonic periods of the periods P1, P2 and P3 (these components are hereinafter respectively referred to as "P1, P2 and P3 second-order harmonic modulation components") to S1(A), S1(B), S2(A), S2(B), S3(A) and S3(B). The response characteristics can be calculated by performing a convolution operation for a sinusoidal wave having a corresponding frequency and an output sensitivity distribution of the light-receiving element array 16B. The response characteristics may, however, be calculated by other calculation methods; for example, a fast Fourier transform may be performed on the sensitivity distribution of the light-receiving element array 16B to calculate the response characteristics.

Subsequently, setting of the coefficients is made from the response characteristics as follows. In this setting, the amplitude ratio between the response of the P2 modulation component to S2(A) and S2(B) and the response of the P2 modulation component to S1(A) and S1 (B) is defined as η1. In addition, a difference between a phase of the response of the P2 modulation component to S1(A) and the phase α2 is defined as γ1(A), and a difference between a phase of the response of the P2 modulation component to S1(B) and the phase α2 is defined as γ1(B). Similarly, the amplitude ratio between the response of the P1 modulation component to S1(A) and S1(B) and the response of the P1 modulation component to S2(A) and S2(B) is defined as η2. A difference between a phase of the response of the P1 modulation component to S2(A) and the phase α1 is defined as γ2(A), and a difference between a phase of the P1 modulation component to S2(B) and the phase al is defined as γ2(B).

Moreover, the amplitude ratio between the response of the P2 modulation component to S2(A) and S2(B) and the response of the P2 modulation component to S3(A) and S3(B) is defined as η3. A difference between a phase of the response of the P2 modulation component to S3(A) and the phase α2 is defined as γ3(A), and a difference between a phase of the response of the P2 modulation component to S3(B) and the phase α2 is defined as γ3(B). Furthermore, the amplitude ratio between the response of the P1 modulation component to S1(A) and S1(B) and the response of the P1 second-order harmonic modulation component to S3(A) and S3(B) is defined as η4. A difference between a phase of the response of the P1 second-order harmonic modulation component to S3(A) and α1×2 is defined as γ4(A), and a difference between a phase of the response of the P1 second-order harmonic modulation component to S3(B) and α1×2 is defined as γ4(B).

Since the reflective scale has a configuration in which a projection magnification of the pattern on the scale to the light-receiving element array is hard to vary due to a variation in distance between the sensor and the scale, a satisfactory effect can be achieved even when the amplitude ratios η1, η2, η3 and η4 are set as fixed values. However, a large displacement between mounting positions (mounting heights) of the light source and the light-receiving element array in the Z direction or a large relative inclination between the scale and the sensor causes a difference in the projection magnification of the pattern on the scale to the light-receiving element array. In such a case, a correction effect can be further enhanced by acquiring the projection magnification by the correction value calculator 43 in a manner described below and then calculating the correction values with the acquired projection magnification being applied to the amplitude ratios η1, η2, η3 and η4.

The term "projection magnification" used for the optical encoder of this embodiment can be rephrased, also for magnetic and capacitive encoders, as a magnification at which each periodic pattern on a scale is detected by a detection element array (in other words, a magnification relating to period).

A phase difference between the P2 modulation components in S2(A) and S2(B) has, since the detection period of the light-receiving element array 16B and the period P2 of each second pattern 27 on the scale 20B coincide with each other as design values, a central design value of 90 degrees. Thus, detecting a difference of the phase differences between S2(A) and S2(B) from 90 degrees enables calculating the difference in the projection magnification.

When a difference of the phase difference from π/2 [rad] (90 degrees) is referred to as a relative phase difference error e [rad], the amplitude components in expression (7) shown in Embodiment 1 can be represented by 2·sin(e/2−π/4) and 2·cos(e/2−π/4), respectively. That is, when an amplitude of S2(A)+S2(B) is represented by S2amp1 and an amplitude of −S2(A)+S2(B) is represented by S2amp2, the relative phase difference error e can be calculated as:

$$e=[\text{Arctan}(S2amp1/S2amp2)+\pi/4]\times 2 \qquad (20)$$

A result of S2amp1/S2amp2 is an amplitude ratio between sinusoidal signals acquired by addition and subtraction of S2(A) and S2(B), which corresponds to a value correlating with a spatial frequency of an image of a periodic pattern detected by the light-receiving element array 16B. However, since the result of S2amp1/S2amp2 varies depending on positions on the scale 20B, it is desirable to perform the detection at multiple points located at a constant interval in the entire region of the scale 20B in the X direction and to average the detected values, so as to improve detection accuracy of the relative phase difference error e.

As another method of detecting the relative phase difference error e [rad], the following method can be employed. This method binarizes S2(A) and S2(B) with their central amplitude values being set as thresholds.

First, detection is made of the following time intervals T1, T2, T3 and T4 within one period.

T1: a time interval from a rising time of S2(A) to a rising time of S2(B)

T2: a time interval from the rising time of S2(B) to a falling time of S2(A)

T3: a time interval from the falling time of S2(A) to a falling time of S2(B)

T4: a time interval from the falling time of S2(B) to the rising time of S2(A)

Next, a calculation of following expression (21) is made to acquire the relative phase difference error e.

$$e=(\tfrac{1}{2}\times(T1+T3)/(T1+T2+T3+T4)-\tfrac{1}{4})\times 2\pi \qquad (21)$$

If the detection accuracy is insufficient due to influence of velocity variation or noise, it is desirable to acquire a sufficient number of samples and average them.

The relative phase difference error e thus acquired enables calculating a projection magnification m as below.

$$m=2/(2\times e/\pi+1) \qquad (22)$$

A calculation of multiplying each of the periods P1, P2 and P3 by the projection magnification m acquired in this manner provides a spatial frequency of each of the P1, P2 and P3 modulation component on the light-receiving element array 16B (light-receiving surface). Then, using these spatial frequencies enables calculating each of the responses, which leads to acquisition of final correction values.

Although the projection magnification is calculated from the phase difference between S2(A) and S2(B) in this embodiment, the projection magnification may be calculated by using a combination of S1(A) and S1(B) or a combination of S3(A) and S3(B). However, in such a case, the projection magnification is necessary to be calculated in consideration of a difference between P1 or P3 and the detection period of the light-receiving element array 16B.

Although this embodiment described the case where all the light-receiving elements 17B constituting the light-receiving element array 16B are commonly used to detect the first, second and third patterns 26, 27 and 28, this embodiment may be applied also to cases where at least part of all the light-receiving elements 17B are used to detect periodic patterns different from one another.

Moreover, although this embodiment described the case where a photo diode array is used as the light-receiving array, an image sensor such as a CCD or CMOS sensor may be used as a light-receiving element array by performing signal processing on an output signal from the image sensor and the above-mentioned processes may be performed on the output signal.

Embodiment 3

Figure 13:
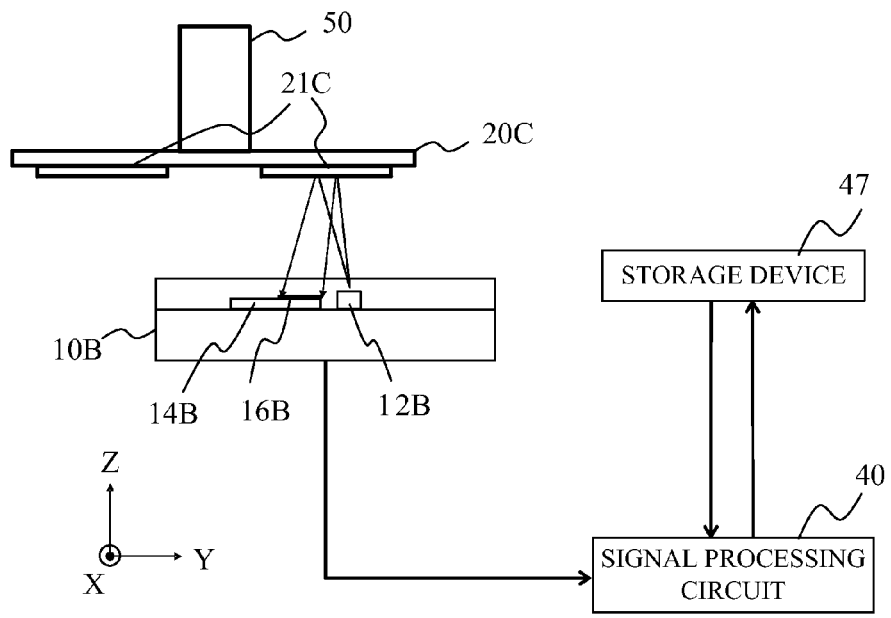
FIG. 13 is a diagram illustrating a configuration of an encoder that is Embodiment 3 of the present invention.

Next, description will be made of a rotary encoder that is a third embodiment (Embodiment 3) of the present invention. FIG. 13 illustrates a configuration of the encoder of this embodiment. In this embodiment, a disk-shaped scale 20C provided with a ring-shaped track 21C formed thereon is attached to a rotational shaft 50. Configurations of a sensor unit 10B and a signal processing circuit 40 are similar to those of Embodiment 2.

Figure 14:
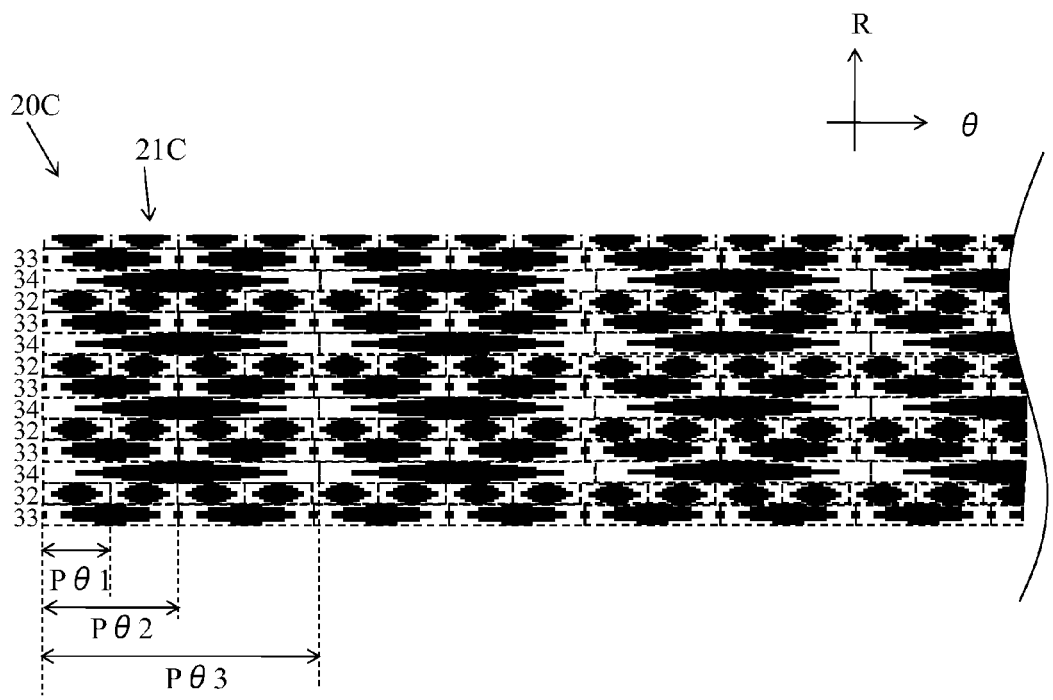
FIG. 14 is a diagram illustrating tracks on a scale in Embodiment 3.

FIG. 14 illustrates periodic patterns formed on the track 21C. On the track 21C, three types of periodic patterns (first patterns 32, second patterns 33 and third patterns 34) whose pitches (periods) are different from one another are periodically (cyclically) arranged in a diameter direction (R direction) orthogonal to a rotational direction (θ direction) that is a movement direction of the scale 20C.

Figure 15A:
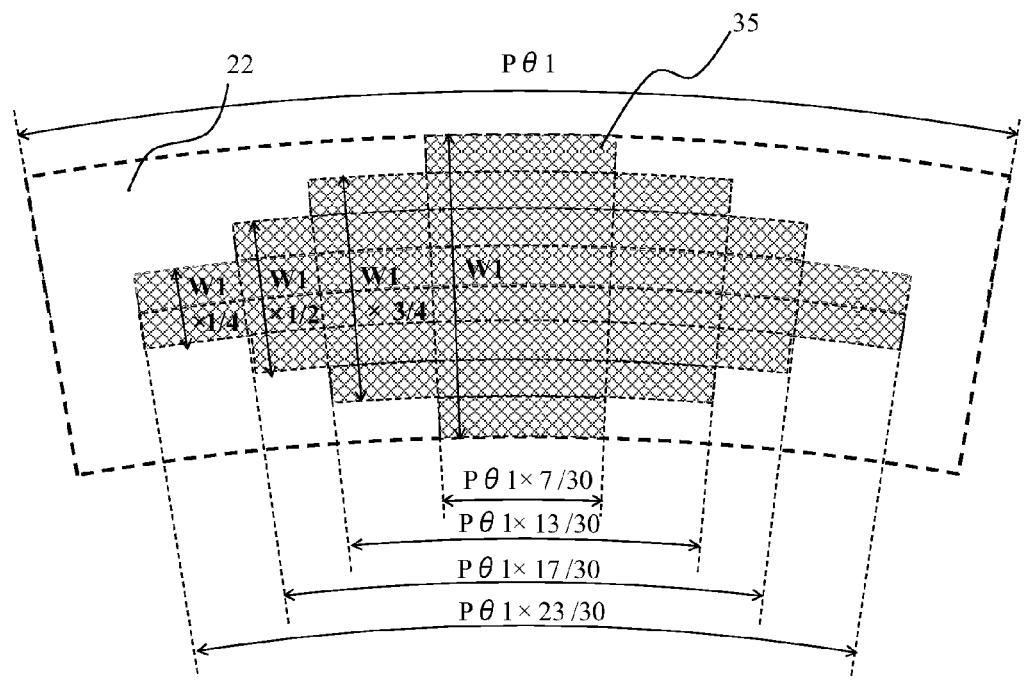
FIGS. 15A to 15C are partially enlarged views of the tracks illustrated in FIG. 14.

FIG. 15A illustrates an enlarged view of a one period part of the first pattern 32 in the θ direction. The first pattern 32 is formed such that the one period parts are periodically arranged at a first pitch Pθ1 (=2.236025°) in the θ direction.

Each one period part is constituted by a reflective portion 35 (illustrated as a black area in the figure) formed by a reflective film reflecting light and a non-reflective portion 22 (illustrated as a white area in the figure). The first pattern 32 has a width W1 of 50 μm in the R direction.

In the one period part, the reflective portion 35 has different lengths in the θ direction at its positions in the R direction. In a region in which a distance from a center in the R direction (hereinafter referred to as "an R-width center") is equal to or shorter than W1/8, a length (hereinafter referred to as "a θ length") of the reflective portion 35 in the θ direction is Pθ1·23/30. In a region in which the distance from the R-width center is W1/8 to W1/4, the θ length of the reflective portion 35 is Pθ1·17/30. In a region in which the distance from the R-width center is W1/4 to W1·3/8, the θ length of the reflective portion 35 is P1·13/30. In a region in which the distance from the R-width center is W1·3/8 to W1/2, the θ length of the reflective portion 35 is P1·7/30.

Figure 15B:
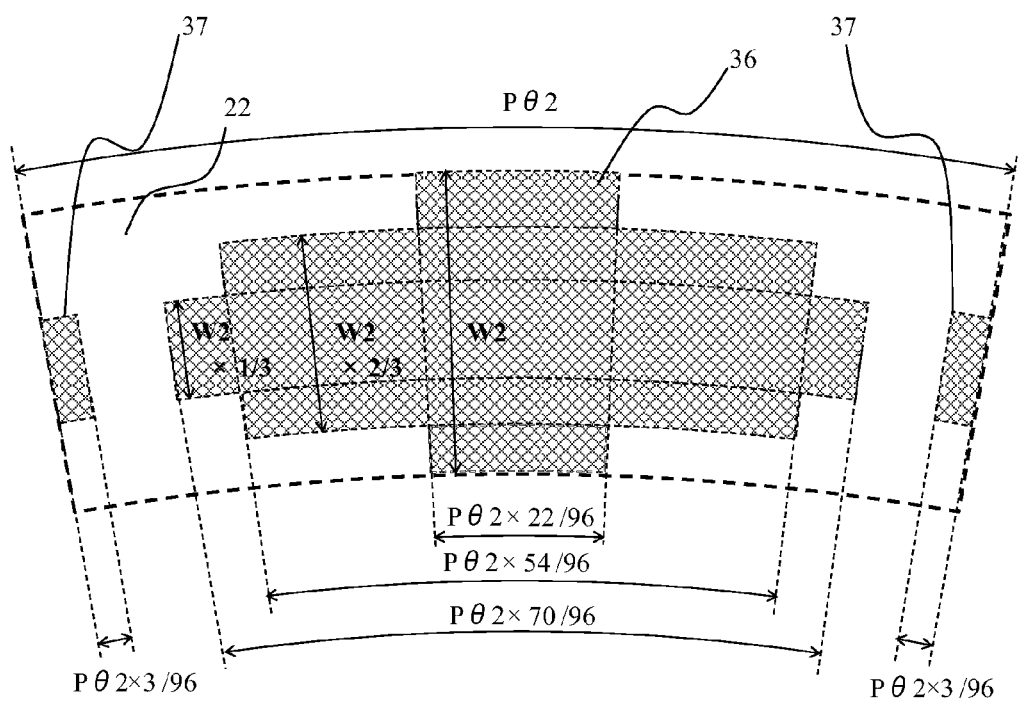

FIG. 15B is an enlarged view of a one period part of the second pattern 33 in the θ direction. The second pattern 33 is formed such that the one period parts are periodically arranged at a second pitch Pθ2 (=4.5°) in the θ direction. The one period part is constituted by reflective portions 36 and 37 (illustrated as black areas in the figure) each formed by a reflective film reflecting light and a non-reflective portion 22 (illustrated as a white area in the figure). The second pattern 33 has a width W2 of 50 μm in the R direction.

In the one period part, the reflective portion 36 has different lengths in the θ direction at its positions in the R direction. In addition, the reflective portion 37 is formed only in each of partial areas of the one period part in the R direction. In a region in which the distance from the R-width center is equal to or shorter than W2/6, the θ length of the reflective portion 36 is Pθ2·70/96. In this region, the reflective portion 37 is formed with a length of Pθ2.3/96 from both ends of the one period part in the θ direction. In a region in which the distance from the R-width center is W2/6 to W2·1/3, the θ length of the reflective portion 36 is Pθ2·54/96. In a region in which the distance from the R-width center is W2·1/3 to W2·1/2, the θ length of the reflective portion 36 is Pθ2·22/96.

Figure 15C:
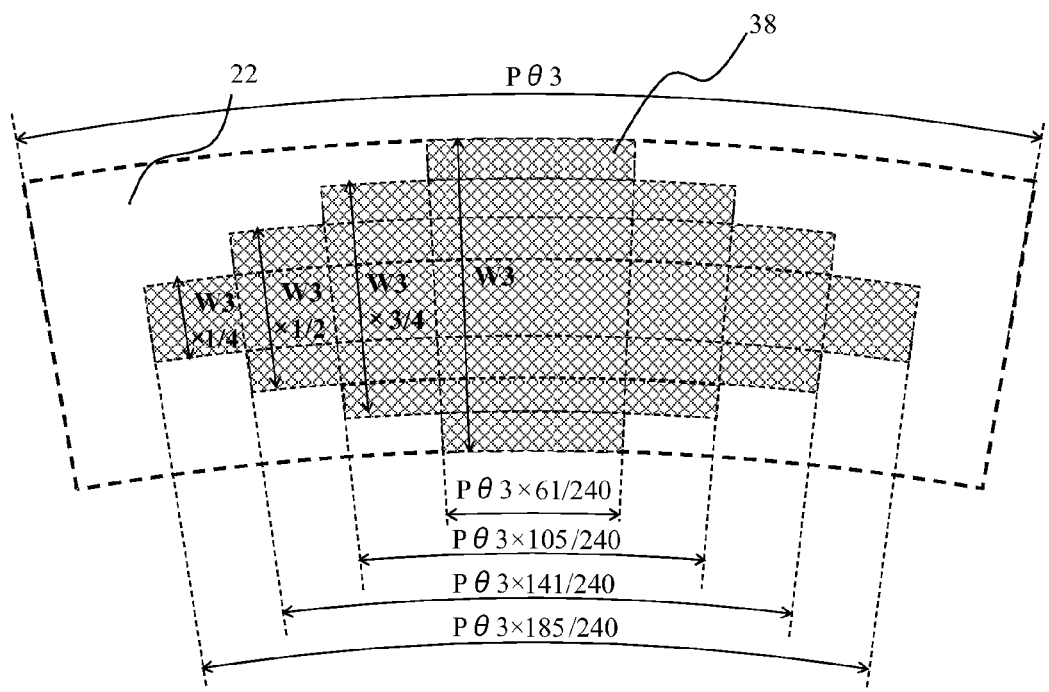

FIG. 15C is an enlarged view of a one period part of the third pattern 34 in the θ direction. The third pattern 34 is formed such that the one period parts are periodically arranged at a third pitch (=9.72973°) in the θ direction. The one period part is constituted by a reflective portion 38 (illustrated as a black area in the figure) formed by a reflective film reflecting light and a non-reflective portion 22 (illustrated as a white area in the figure). The third pattern 34 has a width W3 of 50 μm in the R direction.

In the one period part, the reflective portion 38 has different lengths in the θ direction at its positions in the R direction. In a region in which the distance from the R-width center is equal to or shorter than W3/8, the θ length of the reflective portion 38 is Pθ3·185/240. In a region in which the distance from the R-width center is W3/8 to W3/4, the θ length of the reflective portion 38 is Pθ3·141/240.

In a region in which the distance from the R-width center is W3/4 to W3·3/8, the θ length of the reflective portion 38 is Pθ3·105/240. In a region in which the distance from the R-width center is W3·3/8 to W3/2, the θ length of the reflective portion 38 is Pθ3·61/240.

Next, description will be made of a method of setting coefficients in this embodiment which are amplitude ratios η1, η2, η3 and η4 and phase difference components γ1(A), γ1(B), γ2(A), γ2(B), γ3(A), γ3(B), γ4(A) and γ4(B). When a rotary scale is used as in this embodiment, not only the pitch of the pattern and the projection magnification but also a detection radius in which the sensor reads a pattern image cause a change in spatial frequency formed on the light-receiving element array. However, even in this case, detecting the above-mentioned relative phase difference error e between the two-phase sinusoidal signals enables calculating a difference between the detection period of the sensor and the spatial frequency of the pattern image. That is, detecting the relative phase difference error e between S2(A) and S2(B) (which may be S1(A) and S1(B) or S3(A) and S3(B)) similarly to Embodiment 2 enables calculating the difference between the detection period and the spatial frequency of the pattern image.

Next, on a basis of response characteristics calculated from arrangement design values for the allocation periods (detection periods) in the light-receiving element array 16B, setting of the coefficients is made.

However, instead of the response characteristics calculated from the design values, approximate functions calculated from actually measured values may be used. For instance, the following method may be used. First, S1(A), S1(B), S2(A), S2(B), S3(A) and S3(B) measured at several detection radii are separated by frequencies with a fast Fourier transform. Concurrently with this separation, the relative phase difference error e between S2(A) and S2(B) is measured. Then, from data acquired thereby, a calculation is made of a correlation between the relative phase difference error e between S2(A) and S2(B) and actually measured values of the coefficients, and a calculation of the approximate functions is made from the correlation. The relative phase difference error e may be measured alternatively for S1(A) and S1(B) or S3(A) and S3(B).

Thereafter, as described in Embodiment 2, an acquisition of a phase Φ1 of a signal corresponding to the first pattern 32, a phase Φ2 of a signal corresponding to the second pattern 33 and a phase Φ3 of a signal corresponding to the third pattern 34 is made, and then a calculation of an absolute position is made.

This embodiment can increase, in the rotary encoder, a permissible amount of a position displacement of the sensor unit 10B with respect to the scale 20C in the diameter direction.

Embodiment 4

Figure 16:
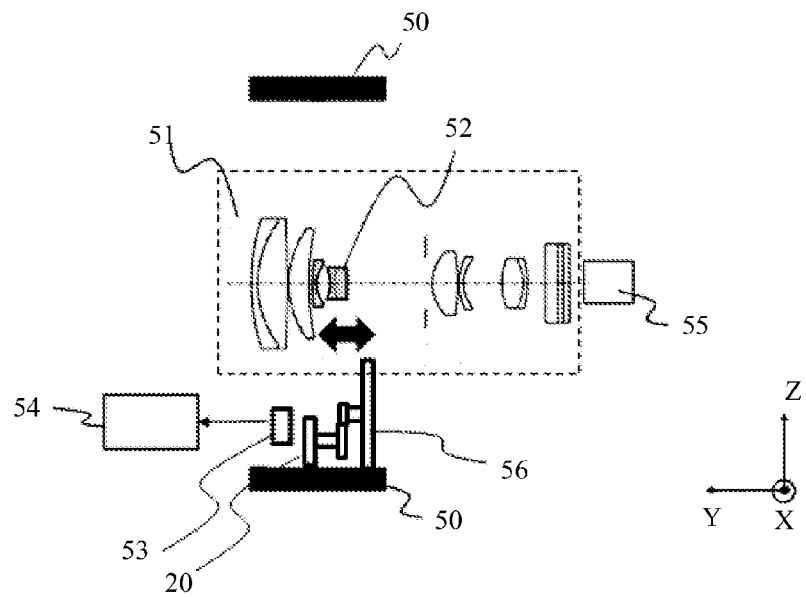
FIG. 16 is a diagram illustrating a configuration of an image pickup apparatus that is Embodiment 4 of the present invention.

FIG. 16 illustrates a schematic configuration of an image capturing apparatus including any one of the encoders described in Embodiments 1 to 3. The encoder is mounted on a lens barrel portion of the image capturing apparatus. Reference numeral 53 denotes a sensor unit (10A or 10B), and 54 a CPU including a signal processing circuit 40. The sensor unit 53, the CPU 54 and a scale 20 constitute the encoder.

Reference numeral 51 denotes an image capturing optical system housed in the lens barrel portion and including a movable lens 52 as a movable member. Reference numeral 55 denotes an image sensor such as a CCD or CMOS sensor. Reference numeral 50 denotes a cylindrical member constituting part of the lens barrel portion. The movable lens 52 is, for example, a lens moved for autofocus and is movable in a Y direction that is a direction of an optical axis (optical axis direction) of the image capturing optical system 51. The movable lens 52 may be one of other lenses, such as a magnification-varying lens and an image-stabilizing lens, which are movable in the optical axis direction or a direction orthogonal thereto. In addition, the image sensor 55 may be used as a movable member instead of the movable lens 52. The cylindrical member 50 is rotatable about the optical axis by receiving a driving force from an actuator (not illustrated) which is provided to drive the movable lens 52.

The scale 20 (e.g., the rotary scale 20C described in Embodiment 3) is coupled with the cylindrical member 50 via a decelerating gear 56. When one of the linear scales 20A and 20B described in Embodiments 1 and 2 is used as the scale 20, the scale 20 may be configured to have a periodic pattern formed on a substrate which is made of a flexible film and is directly attached to an inner surface of the cylindrical member 50 along its rotational direction.

Rotation of the cylindrical member 50 about the optical axis by the driving force from the actuator moves (rotates) the scale 20 with respect to the sensor unit 53, and the movable lens 52 is moved therewith in the Y direction (a direction shown by an arrow). The sensor unit 53 of the encoder outputs a signal (position information) corresponding to position of the movable lens 52 to the CPU 54. The CPU 54 produces a drive signal for moving the movable lens 52 to a target position, thereby controlling the actuator.

Using any one of the encoders described in Embodiments 1 to 3 enables detecting position of the movable lens 52 with high accuracy, which allows moving the movable lens 52 to the target position precisely.

Although this embodiment described the case where the encoder is used for the image capturing apparatus, the encoder of alternative embodiments of the present invention can be used also for other apparatuses than the image capturing apparatus. For instance, the encoder can be used to detect position of a print head and a paper feed roller which are provided to a printer (optical apparatus) or to detect rotational position of a photosensitive drum of a copier (optical apparatus). Furthermore, the encoder can be used also to detect position of a carrying member in an assembling apparatus constituted by a robot arm and the carrying member which carries an object to be assembled.

Each of the above-described embodiments can reduce the signal component changing corresponding to the second period of the second pattern and contained in the first periodic signal, which makes it possible to realize an encoder capable of detecting position of the movable member with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-191095, filed Sep. 13, 2013, which is hereby incorporated by reference herein in their entirety.

What is claimed is:

1. An encoder comprising:
a scale provided with a first periodic pattern having a first period and a second periodic pattern having a second period different from the first period;
a sensor movable relatively with respect to the scale and including a detection element array configured to detect the first and second periodic patterns;
a periodic signal producer configured (a) to produce, by using output from the detection element array detecting the first periodic pattern, a first periodic signal changing corresponding to the first period of the first periodic pattern and (b) to produce, by using output from the detection element array detecting the second periodic pattern, a second periodic signal changing corresponding to the second period of the second periodic pattern;
a correction signal producer configured to produce, by using the second periodic signal, a correction signal for reducing in the first periodic signal a signal component changing corresponding to the second period of the second periodic pattern; and
a position calculator configured to produce, by using the first periodic signal and the correction signal, information indicating position.

2. An encoder according to claim 1, wherein the correction signal is synchronized with the second periodic signal or with a harmonic thereof.

3. An encoder according claim 1, wherein the correction signal producer is configured to produce, as the correction signal, a periodic signal acquired by multiplying the second periodic signal by a predetermined coefficient.

4. An encoder according claim 1, wherein the correction signal producer is configured to calculate a phase of the second periodic signal and to produce, as the correction signal, a periodic signal having a phase obtained by adding a predetermined shift to the calculated phase.

5. An encoder according to claim 1, wherein the correction signal producer is configured to acquire a value correlating with a spatial frequency of an image of the first or second periodic pattern detected by the detection element array and to produce the correction signal by using the value.

6. An encoder according to claim 5, wherein:
the detection element array is configured to output, with its relative movement with respect to the scale, multiple periodic signals whose periods are equal to one another and whose phases are different from one another, and
the correction signal producer is configured to acquire, as the value correlating with the spatial frequency, a phase difference of the multiple periodic signals.

7. An encoder according to claim 5, wherein:
the detection element array is configured to output, with its relative movement with the scale, multiple periodic signals whose periods are equal to one another and whose phases are different from one another, and
the correction signal producer is configured to acquire, as the value correlating with the spatial frequency, a ratio of amplitudes of periodic signals acquired by addition and subtraction of the multiple periodic signals.

8. An encoder according to claim 1, wherein at least part of detection elements constituting the detection element array is commonly used to detect the first and second periodic patterns.

9. An encoder according to claim 1, wherein the sensor is configured to detect the first and second periodic patterns by one of an optical method, a magnetic method and a capacitive method.

10. An apparatus comprising:
an encoder; and
a movable member whose position is to be detected using the encoder,
wherein the encoder comprises:
a scale provided with a first periodic pattern having a first period and a second periodic pattern having a second period different from the first period;
a sensor movable relatively with respect to the scale and including a detection element array configured to detect the first and second periodic patterns;
a periodic signal producer configured (a) to produce, by using output from the detection element array detecting the first periodic pattern, a first periodic signal changing corresponding to the first period of the first periodic pattern and (b) to produce, by using output from the detection element array detecting the second periodic pattern, a second periodic signal changing corresponding to the second period of the second periodic pattern;

a correction signal producer configured to produce, by using the second periodic signal, a correction signal for reducing in the first periodic signal a signal component changing corresponding to the second period of the second periodic pattern; and a position calculator configured to produce, by using the first periodic signal and the correction signal, information indicating position.

* * * * *